United States Patent
Peretz et al.

(10) Patent No.: US 10,840,808 B2
(45) Date of Patent: Nov. 17, 2020

(54) PLUG-AND-PLAY ELECTRONIC CAPACITOR FOR VOLTAGE REGULATOR MODULES APPLICATIONS

(71) Applicant: B. G. NEGEV TECHNOLOGIES AND APPLICATIONS LTD., AT BEN-GURION UNIVERSITY, Beer Sheva (IL)

(72) Inventors: Mor Mordechai Peretz, Lehavim (IL); Alon Cervera, Rehovot (IL); Or Kirshenboim, Tel Aviv (IL)

(73) Assignee: B.G. NEGEV TECHNOLOGIES AND APPLICATIONS LTD., AT BEN-GURION UNIVERSITY, Beer Sheva (IL)

(*) Notice: Subject to any disclaimer, the term of this patent is extended or adjusted under 35 U.S.C. 154(b) by 0 days.

(21) Appl. No.: 16/075,939

(22) PCT Filed: Feb. 9, 2017

(86) PCT No.: PCT/IL2017/050167
§ 371 (c)(1),
(2) Date: Aug. 6, 2018

(87) PCT Pub. No.: WO2017/137996
PCT Pub. Date: Aug. 17, 2017

(65) Prior Publication Data
US 2020/0083808 A1 Mar. 12, 2020

Related U.S. Application Data

(60) Provisional application No. 62/293,349, filed on Feb. 10, 2016.

(51) Int. Cl.
*H02M 3/158* (2006.01)
*H02M 3/156* (2006.01)
*H02M 1/00* (2006.01)

(52) U.S. Cl.
CPC .... *H02M 3/158* (2013.01); *H02M 2001/0025* (2013.01); *H02M 2003/1566* (2013.01)

(58) Field of Classification Search
CPC ......... H02M 2001/0025; H02M 3/156; H02M 3/158; H02M 2003/1566
See application file for complete search history.

(56) References Cited

U.S. PATENT DOCUMENTS

| 5,889,392 A | 3/1999 | Moore et al. |
| 7,583,128 B1 * | 9/2009 | Batarseh ............. G05B 13/021 327/379 |

(Continued)

FOREIGN PATENT DOCUMENTS

| CA | 2751915 A1 | 3/2013 |
| CN | 1207603 A | 2/1999 |

(Continued)

OTHER PUBLICATIONS

Extended European Search Report in related European Patent Application No. 17749985.2, dated Sep. 6, 2019, 9 pages.

(Continued)

*Primary Examiner* — Fred E Finch, III
(74) *Attorney, Agent, or Firm* — FisherBroyles, LLP; Robert Kinberg

(57) ABSTRACT

A plug-and-play Transient Suppression Unit (TSU) for Voltage Regulator Modules (VRMs), which comprises a bi-directional current source connected via a high voltage port and a low voltage port of the TSU in parallel to a voltage output of the VRM, adapted to immediately sink or source current supplied to a load; a detection circuit for detecting mismatches between the voltage output of the VRM to a reference steady-state voltage, which comprises a first comparator for detecting a match between the voltage output of the VRM to the reference steady-state voltage; a second (Continued)

comparator for detecting a mismatch between the voltage output of the VRM to a predefined threshold higher than the reference steady-state voltage; a third comparator for detecting a mismatch between the voltage output of the VRM to a predefined threshold lower than the reference steady-state voltage value; a transient response accelerator, connected via a third port of the TSU to the output compensation port of the VRM error amplifier, and adapted to control duty-ratio saturation of the VRM. A loading transient is detected by the third comparator, upon which the VRM's duty ratio is saturated to a maximal value by the transient response accelerator and current is sourced from the current source to the output, until the first comparator detects that the voltage output of the VRM matches the expected steady-state voltage. An unloading transient is detected by the second comparator, upon which the VRM's duty ratio is saturated to a minimal value by the transient response accelerator and current is sunk from the output into the current source, until the first comparator detects that the voltage output of the VRM matches the expected steady-state voltage.

11 Claims, 18 Drawing Sheets

(56) References Cited

U.S. PATENT DOCUMENTS

| | | | | |
|---|---|---|---|---|
| 7,863,875 B1* | 1/2011 | Guo | ............... | H02M 3/1584 323/275 |
| 8,598,857 B2* | 12/2013 | Pierson | ............... | H02M 3/1584 323/272 |
| 9,257,905 B1* | 2/2016 | Kotikalapoodi | ...... | H02M 3/156 |
| 2002/0171985 A1* | 11/2002 | Duffy | ............... | G06F 1/305 361/90 |
| 2002/0180410 A1* | 12/2002 | Brooks | ............... | H02M 3/156 323/282 |
| 2003/0006650 A1 | 1/2003 | Tang et al. | | |
| 2006/0146583 A1 | 7/2006 | Naka et al. | | |
| 2008/0024100 A1* | 1/2008 | Huang | ............... | H02M 3/158 323/282 |
| 2008/0252277 A1* | 10/2008 | Sase | ............... | H02M 3/157 323/283 |
| 2009/0237854 A1 | 9/2009 | Mok et al. | | |
| 2010/0308654 A1 | 12/2010 | Chen | | |
| 2011/0260703 A1* | 10/2011 | Laur | ............... | H02M 3/1563 323/271 |
| 2012/0069606 A1* | 3/2012 | Sagneri | ............... | H02M 3/158 363/21.02 |
| 2012/0306586 A1* | 12/2012 | Wan | ............... | H02M 3/156 332/109 |
| 2013/0043849 A1* | 2/2013 | Pagano | ............... | H02M 3/156 323/271 |
| 2013/0241289 A1* | 9/2013 | Ogawa | ............... | H02J 1/00 307/52 |
| 2014/0021930 A1 | 1/2014 | Liu et al. | | |
| 2014/0176107 A1* | 6/2014 | Yu | ............... | H02M 1/08 323/285 |
| 2014/0266122 A1* | 9/2014 | Zhu | ............... | H02M 3/156 323/284 |
| 2015/0160669 A1* | 6/2015 | Marschalkowski | ....... | G05F 1/59 323/273 |
| 2015/0188408 A1* | 7/2015 | Huang | ............... | H02M 3/156 323/272 |
| 2015/0200592 A1* | 7/2015 | Chang | ............... | H02M 3/156 323/271 |
| 2015/0364994 A1* | 12/2015 | Dosluoglu | ............... | H02M 3/158 327/306 |
| 2016/0006350 A1 | 1/2016 | Matthew et al. | | |
| 2016/0126841 A1* | 5/2016 | Sandrez | ............... | H02H 7/1213 323/271 |
| 2016/0248328 A1 | 8/2016 | Zhang et al. | | |
| 2016/0276928 A1* | 9/2016 | Mohtashemi | ......... | H02M 3/156 |
| 2016/0359410 A1* | 12/2016 | Kumasaka | ............ | H02M 3/157 |
| 2016/0365789 A1* | 12/2016 | Ejury | ............... | H02M 3/158 |
| 2017/0237345 A1* | 8/2017 | Manlove | ............... | H02M 3/156 323/274 |
| 2017/0264190 A1* | 9/2017 | Unno | ............... | H02M 3/04 |
| 2018/0083533 A1* | 3/2018 | Price | ............... | G05F 3/26 |

FOREIGN PATENT DOCUMENTS

| | | |
|---|---|---|
| CN | 101800474 A | 8/2010 |
| CN | 104638885 A | 5/2015 |
| EP | 0893876 A2 | 1/1999 |
| JP | H05168149 A | 7/1993 |
| JP | 2004522392 A | 7/2004 |
| JP | 2008072833 A | 3/2008 |
| WO | 2016/038601 A1 | 3/2016 |

OTHER PUBLICATIONS

Chinese Search Report in related Chinese Patent Application No. 2017800107119, dated Oct. 7, 2019, 6 pages with English Translation.
International Search Report for PCT/IL2017/050167 dated May 15, 2017.
Written Opinion for PCT/IL2017/050167 dated May 15, 2017.
Japanese Office Action in corresponding Japanese Patent Application No. 2018543164, date of drafting Sep. 23, 2020, 15 pages with English Translation.

* cited by examiner

PLUG-AND-PLAY ELECTRONIC CAPACITOR FOR VOLTAGE REGULATOR MODULES APPLICATIONS

FIELD OF THE INVENTION

The present invention relates to the field of Voltage Regulator Modules (VRMs). More particularly, the invention relates to a capacitor-like Transient Suppression Unit (TSU) to enhance the performance and reduce the overall volume of VRMs, especially reducing the value and volume of the physical output capacitance required at the output of the VRM to sustain load transients within defined boundaries.

BACKGROUND OF THE INVENTION

A target feature in present-day Voltage Regulator Modules (VRMs) is the ability to maintain a well-regulated, virtually constant, output voltage under a wide range of load changes while maximizing power density. A key consideration to achieve this goal is the physical size of the passive components that prohibits full integration of the solution. Various modern applications raise the switching frequency and employ multi-phase converters to enhance the transient response that allow integration of an inductor. On the other hand, sizing of the output capacitor in VRM applications primarily depends on the load transient magnitude and rate, and therefore consumes a significant portion of PCB area.

To minimize the effect of load transient, several approaches to enhance the control bandwidth that result in saturation of the duty ratio have been described. Methods such as current-programmed mode control and its derivatives, time-optimal and minimum-deviation control, have shown transient response with virtually the smallest possible voltage deviation, restricted only by the inductor current slew-rate. The main limitation of these methods is the weak regulation during unloading transient due to the high input-to-output conversion ratio.

State-of-the-art solutions that exceed the performance of the time-optimal control method, especially for unloading transients, propose several circuit extensions in order to increase the inductor current slew-rate, either by internal changes to the topology, addition of fast auxiliary circuits in parallel to the main converter, or by connecting an auxiliary unit at the load side. These solutions often require specially-tailored controllers (sometimes combined with a digital design) or multi-mode compensation schemes. The additional layers of complexity are the prominent reason for the lack of absorbance, of such promising technology, in commercial VRM applications. As evident, many VRM solutions rely on the well-established analog compensators to guarantee reliability, performance and above all reduced complexity and cost. It would be extremely advantageous, and potentially better absorbed by the industry, if the auxiliary transient suppression unit (TSU) could be integrated as an add-on unit to the VRM without the need to interfere, replace or modify the original design.

It is therefore an object of the present invention to provide a plug-and-play TSU for VRM applications that trades the output capacitance by a silicon-based solution without affecting the steady-state operation, the originally designed compensation network and the input filter.

Other objects and advantages of this invention will become apparent as the description proceeds.

SUMMARY OF THE INVENTION

The present invention is directed to a plug-and-play Transient Suppression Unit (TSU) for Voltage Regulator Modules (VRMs), which comprises:
a. a bi-directional current source connected via a high voltage port and a low voltage port of the TSU in parallel to a voltage output of the VRM, adapted to immediately sink or source current supplied to a load;
b. a detection circuit for detecting mismatches between the voltage output of the VRM to a reference steady-state voltage, comprising:
   i. a first comparator for detecting a match between the voltage output of the VRM to the reference steady-state voltage;
   ii. a second comparator for detecting a mismatch between the voltage output of the VRM to a pre-defined threshold higher than the reference steady-state voltage; and
   iii. a third comparator for detecting a mismatch between the voltage output of the VRM to a pre-defined threshold lower than the reference steady-state voltage value; and
c. a transient response accelerator, connected via a third port of the TSU to the output compensation port of the VRM error amplifier, adapted to control duty-ratio saturation of the VRM,
wherein a loading transient is detected by the third comparator, upon which the VRM's duty ratio is saturated to a maximal value by the transient response accelerator and current is sourced from the current source to the output, until the first comparator detects that the voltage output of the VRM matches the expected steady-state voltage, wherein an unloading transient is detected by the second comparator, upon which the VRM's duty ratio is saturated to a minimal value by the transient response accelerator and current is sunk from the output into the current source, until the first comparator detects that the voltage output of the VRM matches the expected steady-state voltage.

By using the term "plug-and-play" unit it is meant to include any hardware component or physical device in a system that after being connected to the system's inherent interface connections, is discovered by the system and starts functioning within the system, without the need for physical device configuration, user intervention, or additional connections. In the case of the present invention, the "plug-and-play" unit is the TSU and the system to which the "plug-and-play" TSU is connected is the VRM's controller.

The bi-directional current source may comprise a gyrator resonant switched-capacitor converter (GRSCC).

The transient response accelerator may be connected via a third port of the TSU to the input of the gate driving circuitry of the power switches of the VRM.

In one embodiment, the TSU further comprises a fourth port connected to a voltage source higher than the voltage output of the Voltage Regulator Module (VRM), where the bi-directional current source comprises:
a. a first MOSFET with a high $R_{DS(on)}$ value connected between the fourth port of the TSU and the high voltage port of the TSU, adapted to source current during loading transitions; and
b. a second MOSFET with a high $R_{DS(on)}$ value connected between the high voltage port of the TSU and the low voltage port of the TSU, adapted to sink current during unloading transitions.

The TSU may further comprise a fourth port connected to a voltage source higher than the voltage output of the voltage regulator module (VRM), where the bi-directional current source comprises a buck converter operating in a discontinuous conduction mode.

The transient response accelerator may comprise a first pull-up transistor and a second pull-down transistor, the transistors being complementary, the transistors connected to a compensation port of an error amplifier of the voltage regulator module (VRM), the transistors adapted to saturate the VRM's duty ratio.

Loading or unloading transients may be detected upon exceeding a window being between low and high reference steady-state voltages, which is constant, or proportional to the output voltage.

The detection circuit may comprise:
a) a first voltage divider ladder for setting a different reference voltage to each of the comparators; and
b) a second voltage divider ladder for measuring the output voltage of the VRM.

Alternatively, the detection circuit may comprise:
a) a first current source and circuitry, for sensing the output voltage;
b) a second current source and circuitry, for generating a low threshold voltage, independent of the output voltage;
c) a third current source and circuitry, for generating a high threshold voltage, independent of the output voltage;
d) a first comparator, receiving the low threshold voltage and the output voltage, for providing an indication whenever the output voltage falls below the low threshold voltage; and
e) a second comparator, receiving the high threshold voltage and the output voltage, for providing an indication whenever the output voltage rises above the high threshold voltage.

In another embodiment, the transient response accelerator comprises:
a) a first pull-up transistor and a second pull-down transistor, the transistors being complementary, the transistors connected to a compensation port of an error amplifier of a current-mode controller of the Voltage Regulator Module (VRM), the transistors adapted to saturate the VRM's duty ratio;
b) an error amplifier, the compensation port of which being connected to the transistors via a resistive element;
c) a peak detector for tracking changes in the inductor current; and
d) a capacitor, connected between the compensation port and ground, for storing the inductor current represented by voltage on the capacitor, such as at the end of the transient period, the capacitor stores a voltage corresponding to a new steady-state point of the inductor current.

The TSU may further comprise a switch for disconnecting the reference capacitor $C_{Iref}$ from the feedback loop whenever the TSU is active, and for reconnecting the reference capacitor $C_{Iref}$ to the current mode controller, whenever the TSU is active and after the transient is terminated.

DETAILED DESCRIPTION OF THE INVENTION

The present invention provides a plug-and-play Transient Suppression Unit (TSU) for voltage regulator module (VRM) applications. The TSU trades the output capacitance by a silicon-based solution without affecting the steady-state operation, the originally designed compensation network and the input filter.

Figure 1:
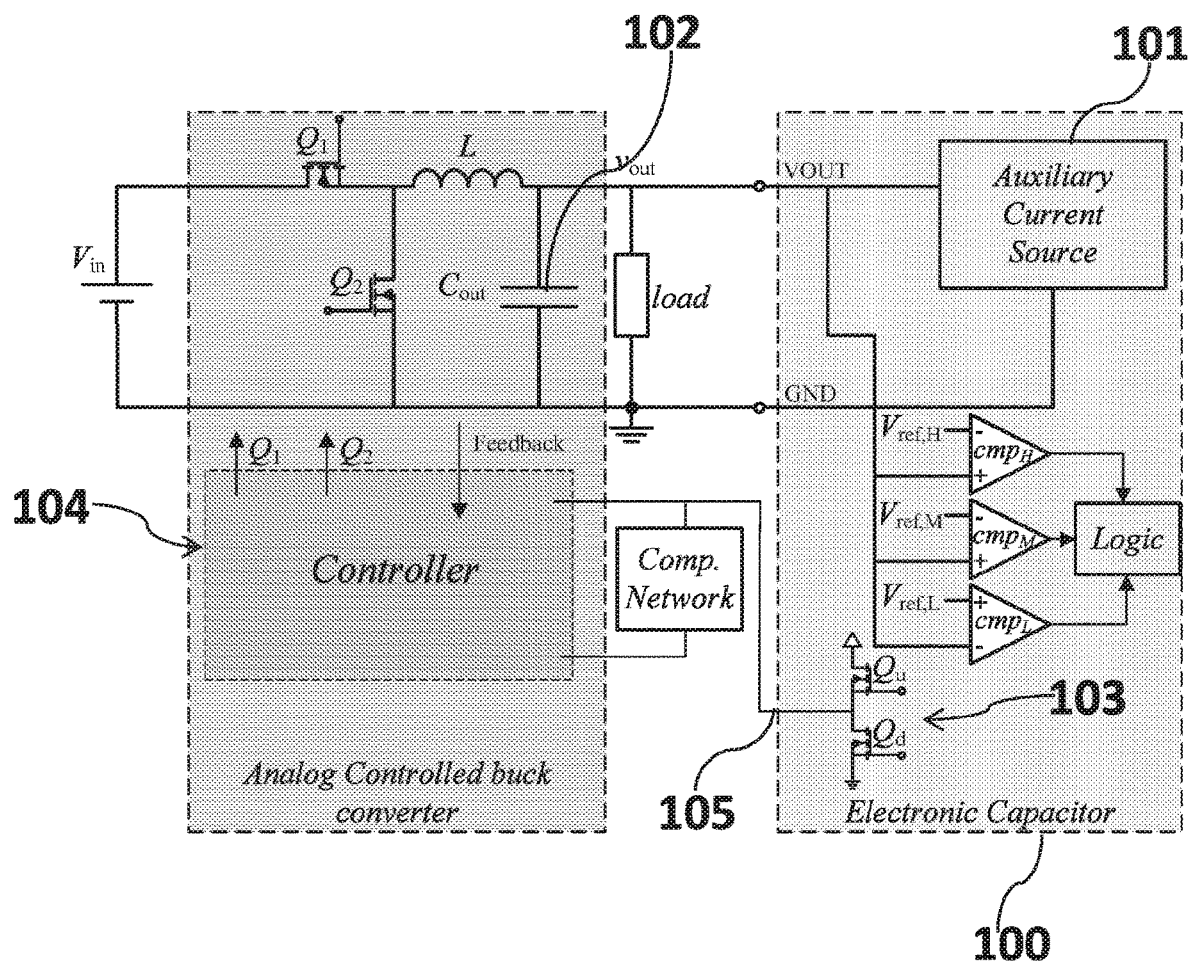
FIG. 1 schematically illustrates a block representation of the electronic capacitor circuit connected to a buck converter.

FIG. 1 shows a block diagram of the electronic capacitor circuit connected to a buck converter. As shown in FIG. 1, TSU 100 comprises a bi-directional current source 101 that connects in parallel to the buck converter's output capacitor 102, and a transient response accelerator 103 that connects in parallel to the output of the error-amplifier 104. Since the Electronic Capacitor 100 is active only during load transients, the steady-state precision is not jeopardized and the design procedure for the buck converter remains intact.

In various embodiments, current source 101 can be implemented by a Gyrator Resonant Switched-Capacitor Converter (GRSCC) as described in WO2016/038601. GRSCC does not require a magnetic element, making it ideal for integration, simple and cost-effective.

Transient Suppression Concept

A key factor for assisting the recovery of the main converter from a load transient is the capability of the auxiliary circuit to rapidly sink or source the current mismatch between the new load current and the main inductor current.

Figure 2:
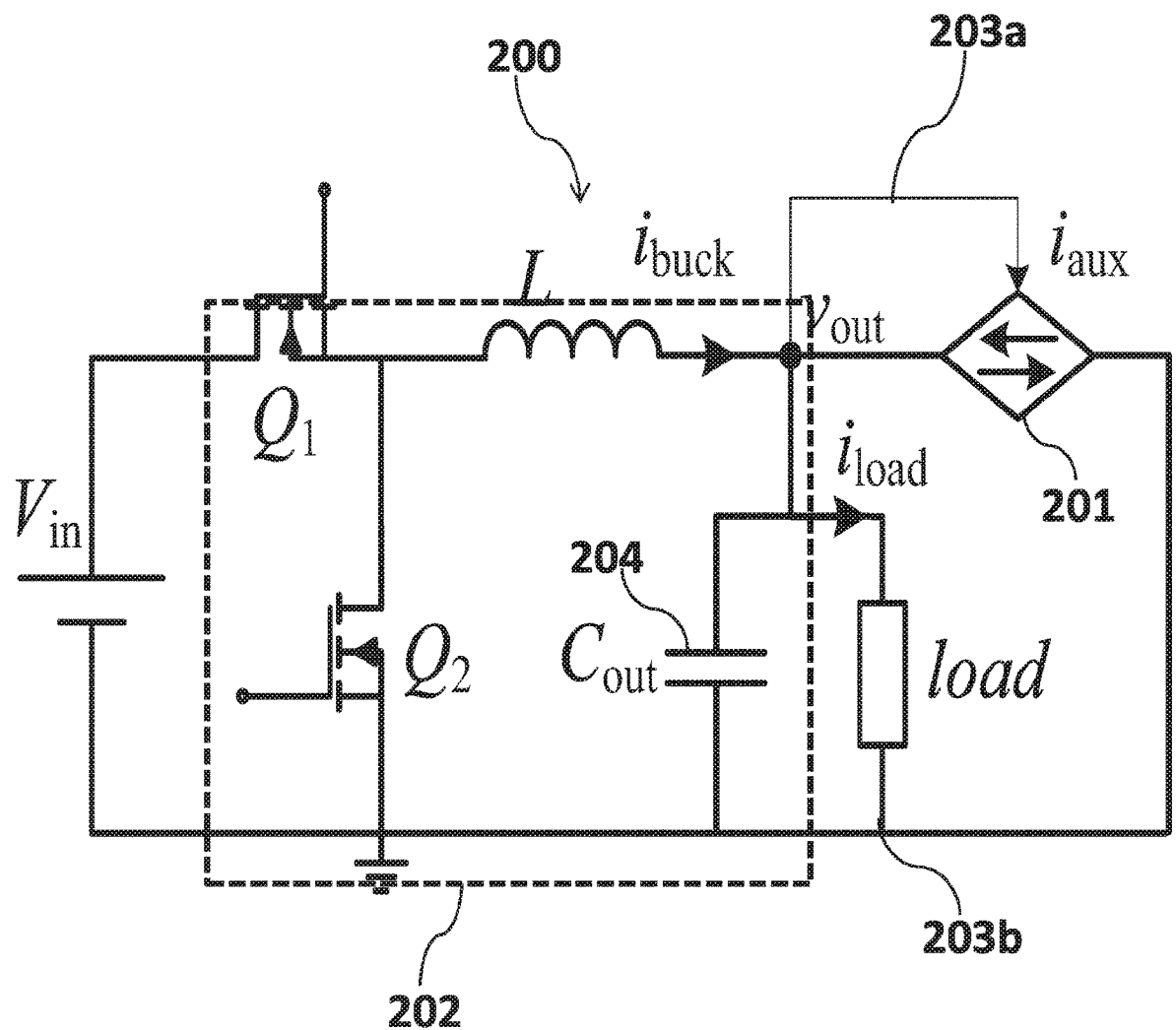
FIG. 2 schematically illustrates a simplified VRM circuit with an auxiliary circuit modelled as a controlled current source.

FIG. 2 schematically illustrates a simplified VRM circuit 200 with the auxiliary circuit modelled as a bi-directional controlled current source 201, demonstrating the current relationships towards the load. To analyze the required behavior and control mechanism of the auxiliary TSU, an idealized bi-directional current source that is connected to the output terminals 203a and 203b of the buck converter 202 is assumed.

Figure 3:
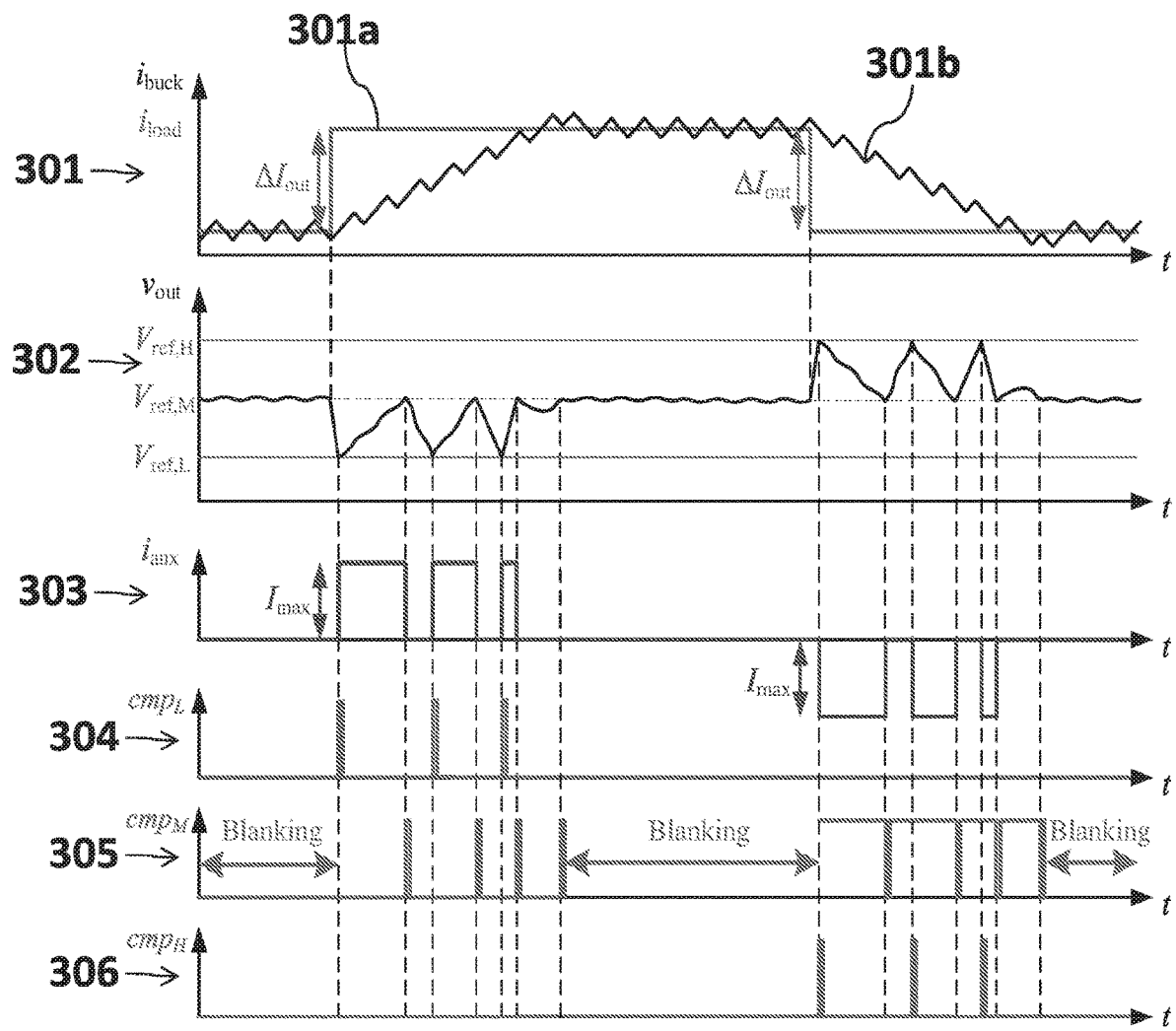
FIG. 3 schematically illustrates waveforms for consecutive loading and unloading transients.

FIG. 3 shows waveforms for consecutive loading and unloading transients with a magnitude of $\Delta I_{out}$. Graph 301 is a graphical representation of the buck current $i_{buck}$, 301b, compared to the current consumed by the load $i_{load}$, 301a. Waveform 302 is a graphical representation of the output voltage $v_{out}$ of the buck converter, wherein the voltage is limited by $V_{ref,H}$ and $V_{ref,L}$. $V_{ref,M}$ is the steady state voltage rate. Waveform 303 is a graphical representation of the current supplied from the auxiliary circuit. Waveforms 304, 305 and 306 are graphical representations of comparator outputs comparing the buck's output voltage to $V_{ref,L}$, $V_{ref,M}$ and $V_{ref,H}$, respectively.

Figure 4:
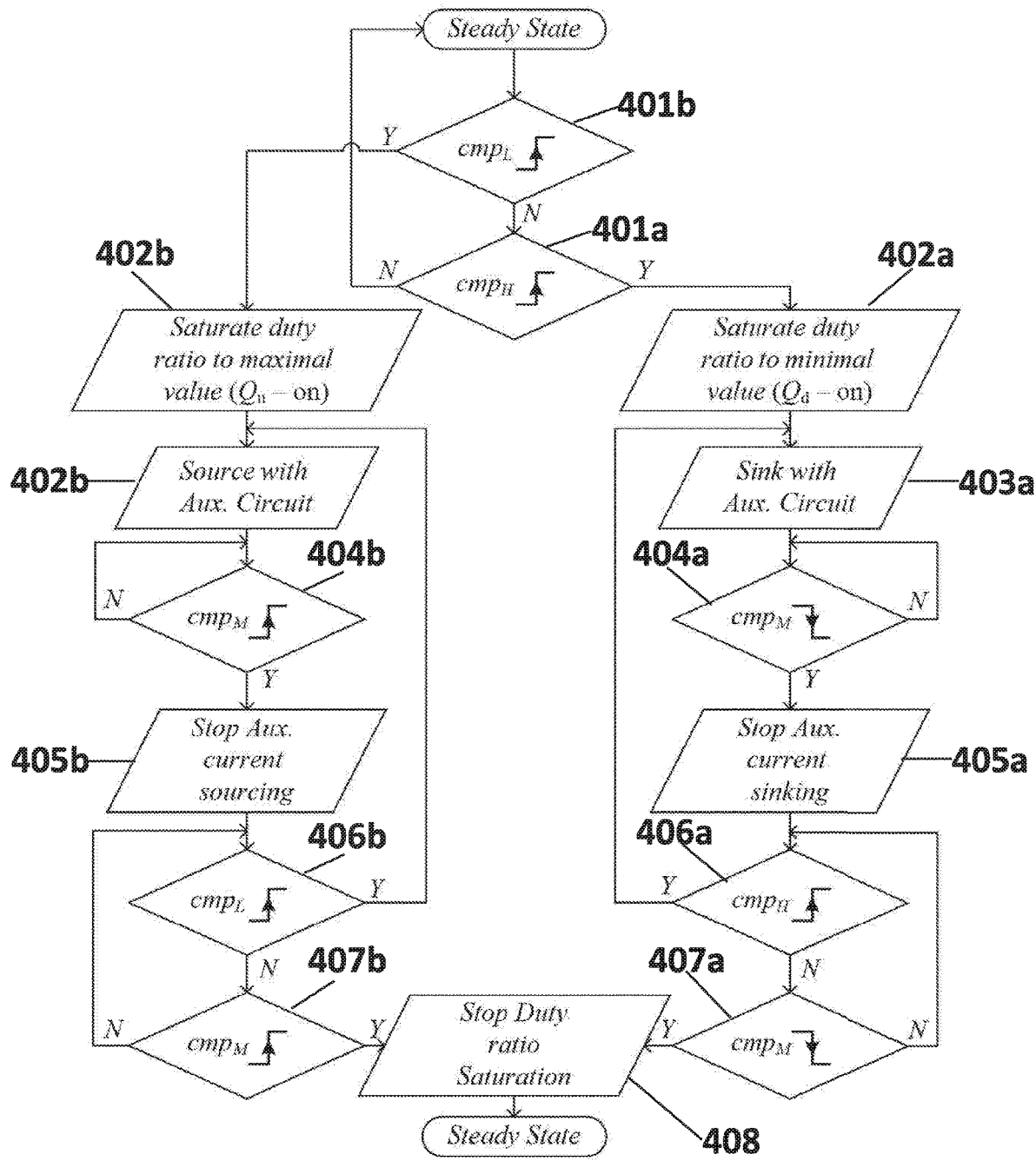
FIG. 4 schematically illustrates a flowchart 400 of the electronic capacitor circuit operation algorithm.

FIG. 4 shows a flowchart 400 of the electronic capacitor circuit operation algorithm. The left hand side of flowchart 400 represents steps performed during loading transients, and the right hand side of flowchart 400 represents steps performed during unloading transients. Transient operation is initiated upon its detection in step 401a or 401b by an upper or lower comparators respectively (i.e. by comparing $v_{out}$ to $V_{ref,H}$ and $V_{ref,L}$, and as depicted in waveforms 306 and 304, respectively), indicating a charge mismatch in the output capacitor, numeral 204 in FIG. 2. Upon detection of a transient, two actions are simultaneously performed: the duty ratio of the primary (buck) converter is saturated to either maximum (step 402b) or minimum value (step 402a), depending on the transient type. That is, for loading transient transistor Qu is on which drives the output of the compensation network to its highest possible value (saturation to VDD) and by doing so, maximizing the control command for the PWM modulator of the buck controller. For unloading transients Qd is on which drives the output of the compensation network to the lowest value (saturation to GND) and the control command to the PWM modulator would be the minimum value. The second action upon transient detection is that the (bi-directional) current source is enabled and sinks (in step 403a) or sources (in step 403b) with a constant magnitude of $I_{max}$ (the converter's nominal current), as depicted in waveform 303.

$i_{aux}$ is higher than the current mismatch between $i_{buck}$ and $i_{load}$, therefore the output voltage returns to the steady-state value. This is detected in steps 404a and 404b by an additional comparator with voltage reference set to $V_{ref,M}$ as depicted in waveform 305. At this point, the auxiliary (bi-directional) current source is halted, in steps 405a and 405b, while the duty ratio continues to be saturated. In case that a current mismatch still exists, the output voltage moves away from the steady-state value, crossing the comparator threshold again, being detected in steps 406a and 406b, and re-triggering the auxiliary circuit in steps 403a and 403b. This procedure continues until the steady-state comparator (with threshold $V_{ref,M}$) is triggered twice (or triggered and remains in the new state) as detected in steps 407a and 407b, which indicates that charge balance is achieved, i.e. $i_{buck} \approx i_{load}$; $v_{out} = V_{ref,M}$, and the duty ratio saturation is discontinued in step 408.

Transient Response Accelerator

Figure 5:
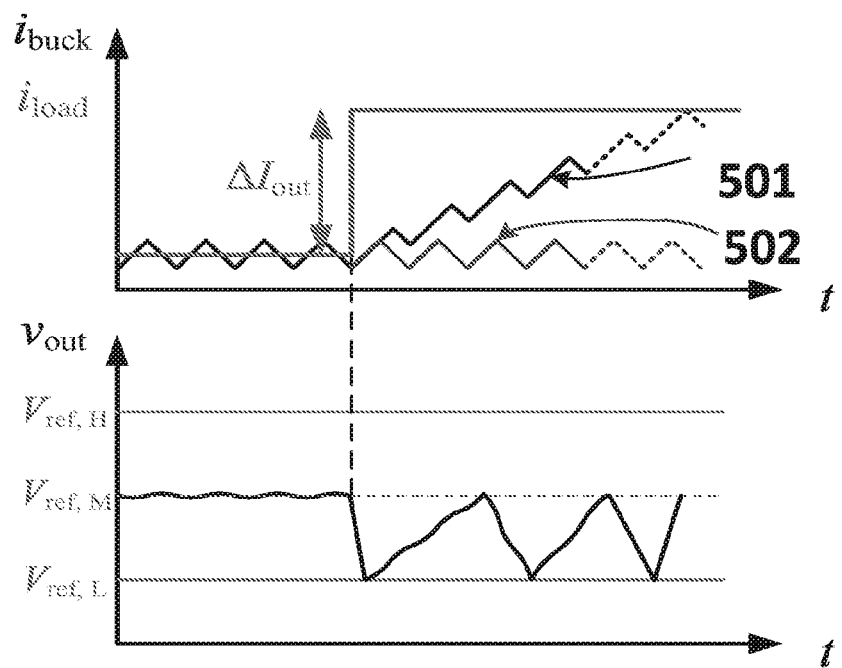
FIG. 5 schematically illustrates the inductor current response with and without a response accelerator.

To successfully recover from a load transient, both the output voltage and the inductor current must move to the new steady-state operating point. This typical feature presents a challenge for perfect transient response where virtually zero output voltage deviation is evident. Since the auxiliary TSU acts as an infinite capacitor and is connected in-situ to a tightly-compensated voltage regulator, the error signal at the error amplifier (E/A) terminals is zero. As a result, the inductor current would not ramp up or down to the new steady-state point as depicted in FIG. 5, which shows the inductor current response with (numeral 501) and without (numeral 502) the response accelerator. To overcome this challenge, a third port (numeral 105 in FIG. 1) of the electronic capacitor, connected to a response accelerator unit (numeral 103 in FIG. 1) is added.

Figure 6:
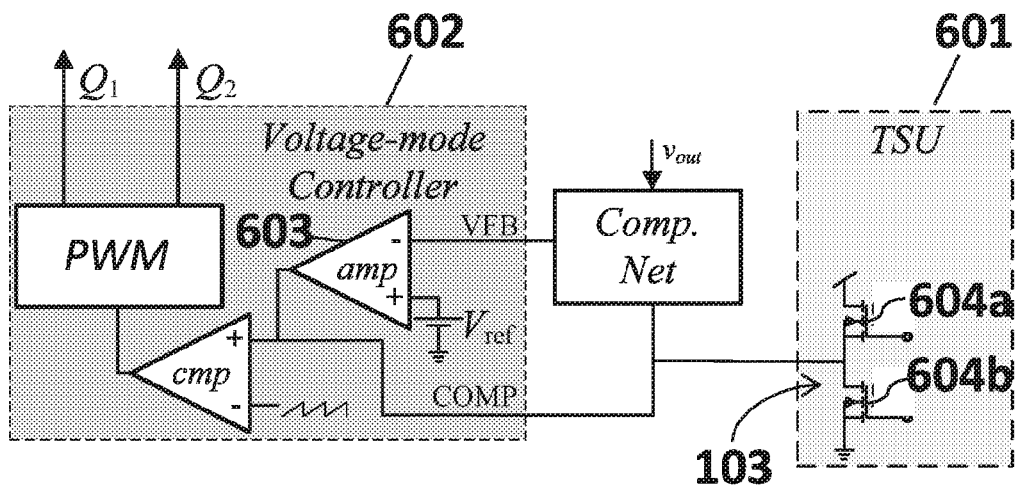
FIG. 6 schematically illustrates the use of a transient response accelerator for a voltage-mode controller.

FIG. 6 schematically illustrates the use of a transient response accelerator 601 for a voltage-mode controller 602, wherein a pull-up/pull-down network 103 connected to the compensation port of Error Amplifier (E/A) 603, in order to force duty-ratio saturation. In voltage-mode controllers, such as 602 in FIG. 6, the output of the internal E/A connects to the PWM generator and is accessible via an external port in most external-compensation designs. By connecting two complementary transistors, for pull-up and pull-down, 604a and 604b respectively, the duty-ratio can be saturated during load transients. Since zero error signal is maintained at the E/A terminals during this operation, the E/A can be momentarily bypassed by the transient response accelerator and then restored without any concerns for integrator windup or compensation reset. It is noted that this approach does not interfere with the compensation loop and avoids the need to redesign the network—an advantage over other dual-mode applications.

Figure 7:
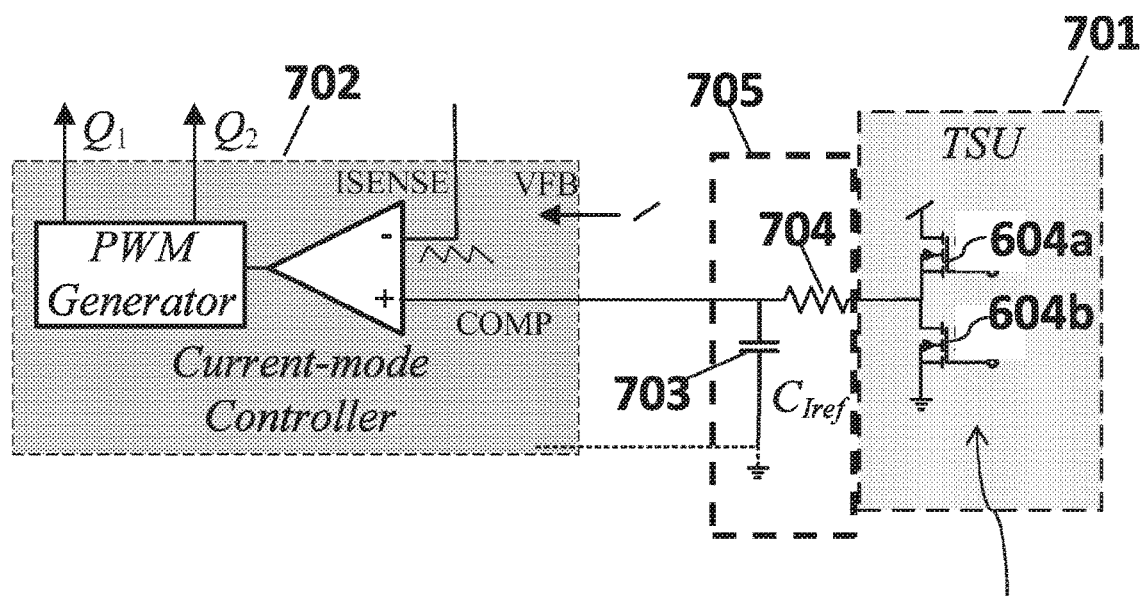
FIG. 7 schematically illustrates the use of a transient response accelerator for a current-mode controller.

FIG. 7 schematically illustrates the use of a transient response accelerator 701 for a current-mode controller 702. The duty-ratio saturation can be done in a similar manner to the case of voltage-mode controllers by activating the pull-up and pull-down transistors (604a and 605b respectively) during load transients. However, as opposed to voltage-mode controllers, ramping up the current and maintaining the output voltage for the new load is not sufficient. In current-mode control, as a result of a two-loop compensation approach, the information of the inductor current is a controlled state variable as well. The information of the reference value for the inductor current, which is a product of the outer voltage feedback loop, is typically stored as voltage on capacitor 703, $C_{Iref}$ of the compensation network 705, and must be updated to a correct value during the operation of the TSU so that by the end of the transient period it stores the information, i.e. the relevant voltage, of the new steady-state point of the inductor current.

In one embodiment, the inductor current reference is updated by charging/discharging the reference capacitor at a rate equivalent to the current-slew at saturated duty-ratio.

Figure 8:
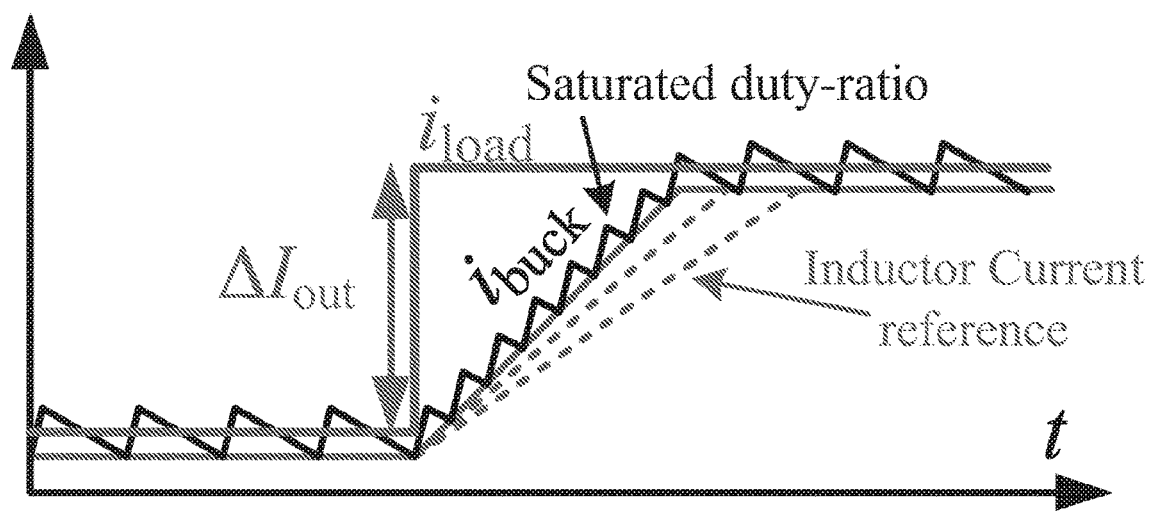
FIG. 8 schematically illustrates permitted duty ratio rate increases.

FIG. 8 shows permitted increases of the duty ratio rate. Using this approach, the reference voltage must ramp-up/down slower than or at the maximum inductor current slew-rate, and thus it requires prior information about the inductance value, duty-ratio limits, input voltage and the output voltage. In case this a-priori information is available, a resistive element (numeral 704 in FIG. 7) can be added to limit the reference ramp-up/down while saturating the duty-ratio using a second set of pull-up/down transistors.

In another embodiment, any requirements of prior knowledge of the main power converter are eliminated, by utilizing the information of the inductor current that is already available within the compensation loop.

Figure 9:
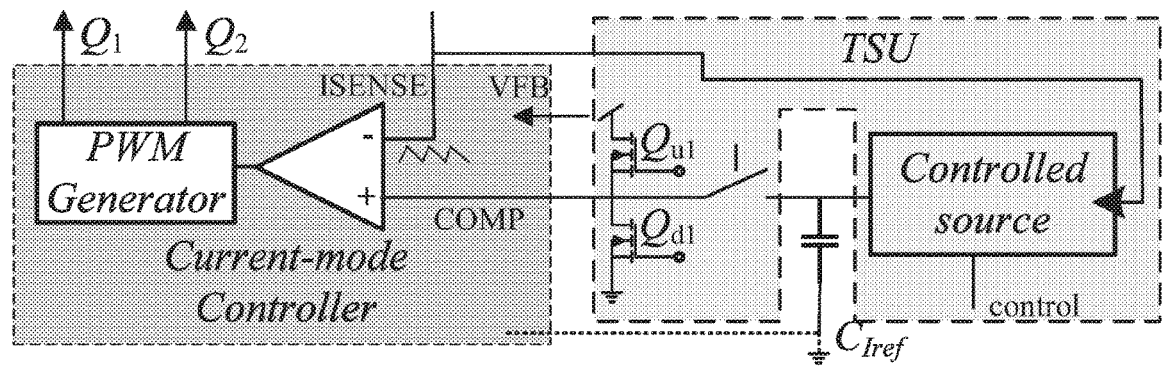
FIG. 9 schematically illustrates a mechanism to control the value of a compensation network capacitor according to the sensed current.

FIG. 9 schematically illustrates a mechanism to control the value of $C_{Iref}$ according to the sensed current. During transients, $C_{Iref}$ (which is the compensation capacitor of the current mode controller) is disconnected from the compensation node which is pulled up or down (depending on the transient type). In this method, the inductor current (or a sensed version of it) during transients is used, setting the compensation (reference) capacitor $C_{Iref}$ (which is not a part of the TSU) to the new operating point. By utilizing this already existing information, the new reference point is accurately and continuously updated during the transient period so that the compensator is within a zero-error state at all times, similar to the operation of the voltage-mode TSU approach, as described hereinabove.

The current mode TSU includes a controlled source which tracks the inductor current (or a sensed version of it) and replicates it to the (compensation) reference capacitor $C_{Iref}$. The TSU also comprises a pull-up transistor $Q_{u1}$ a pull-down transistor $Q_{d1}$ and an optional switch 1.

The TSU comprises a first current feedback loop, which controls the inductor current according to a second external feedback loop, which samples the output voltage $v_{out}$.

After the load transient period, the new operating point that describes the inductor current is reflected as a DC voltage on the reference capacitor $C_{Iref}$. A zero voltage error means that the operating point of the output voltage $v_{out}$ is equal to the reference voltage. The controlled source keeps the error voltage zero and is used to saturate the duty-ratio, in order to move from an operating point to another operating point. Since the error voltage is zero, there is no need for any correction in the feedback loop.

An example of this approach is demonstrated for a constant on-time current controlled converter in which only information on the low-side transistor current is available.

Figure 10:
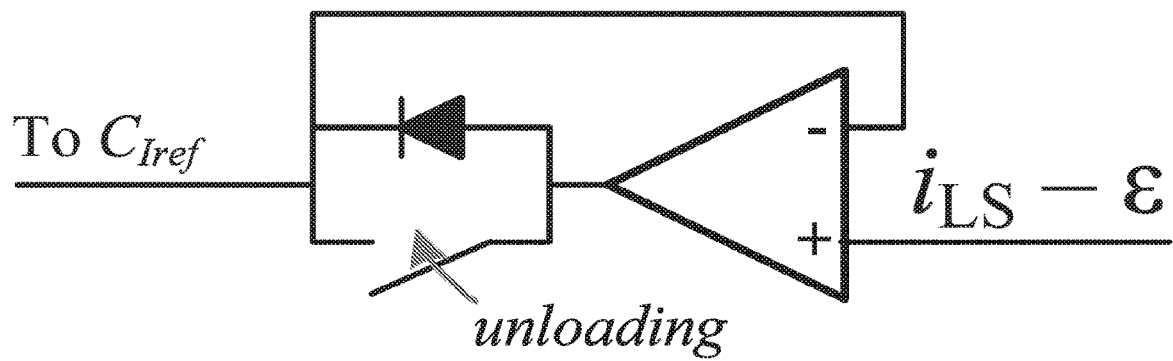
FIG. 10 schematically illustrates a configuration which acts as a peak-detector circuit during loading transients.

FIG. 10 shows a configuration which acts as a peak-detector circuit during loading transients which is used to track the inductor current, while acting as a buffer during unloading transients. In order to update the voltage of the reference capacitor $C_{Iref}$ with the new operating point of the inductor current, it is essential that the voltage will start from the actual operating point, rather than the operating point before transient started. This is done by receiving the value of the inductor current via capacitor $I_{sense}$ output (which commonly exists in VRMs).

In response to a loading transient, the switch is open (non-conducting), thereby allowing the circuit to operate a peak detector. In response to an unloading transient, the switch is closed (conducting), thereby allowing the circuit to track the voltage which is developed on the reference capacitor $C_{Iref}$. This voltage is shown in FIG. 11 (blue line).

In order to prevent conflict between the voltage of the reference capacitor $C_{Iref}$ and the feedback voltage provided by the TSU, an optional switch l is added. When the TSU is active, the switch is open and the reference capacitor $C_{Iref}$ is disconnected from the feedback loop and the controlled source updates the voltage on the reference capacitor $C_{Iref}$ to correspond to the new current. After the transient is terminated, the switch l is closed again and the reference capacitor $C_{Iref}$ returns to be part of the current mode controller, while being charged to the updated operating point.

Figure 11:
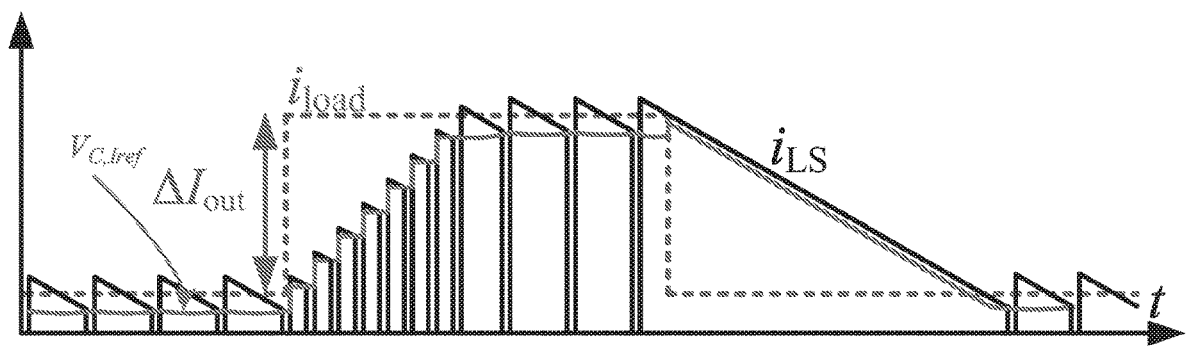
FIG. 11 schematically illustrates an example of the output of the circuit in FIG. 10 during loading and unloading transients FIGS. 12a-12b schematically illustrate possible implementations of a detection circuit.

FIG. 11 illustrates an example of the output of the circuit in FIG. 10 during loading and unloading transients. The low-side current $i_{LS}$ enters the circuit with a small negative offset of ε to charge/discharge $C_{Iref}$ to the target value, as illustrated in FIG. 11. With this approach, no prior information on the inductor or the input and output voltages is needed. By pulling-up/down the inductor current, the sensed inductor current itself can be used to cause the capacitor voltage to follow the inductor current, while a set of transistors is used to pull up/down the compensation node to saturate the duty-ratio.

It can be seen that during steady state before transient (left side), the voltage developed on the reference capacitor $C_{Iref}$ (blue line) is almost identical to the voltage representing the current operating point (red line). In response to loading transient, the load current $I_{load}$ abruptly increases by $\Delta_{out}$. As a result of the saturating the duty cycle, the inductor current increases and the reference capacitor $C_{Iref}$ is charged to a new value, which corresponds to the new inductor current. Charging is completed toward reaching to the middle of transient period (blue line). The black line represents the changes in the inductor current. After the inductor current stabilizes, the voltage developed on the reference capacitor $C_{Iref}$ is kept constant. A similar process takes place in down going transient, when the inductor current falls.

Comparators Thresholds Settings

As described above, the thresholds values dictate the worst-case voltage deviation that is permitted. Since the operation of the electronic capacitor is enabled during transient events, it is necessary to set the thresholds so that the steady-state voltage ripple avoids false transient triggering. An extra measure to avoid false detection is to assure sufficiently large margins between the thresholds to accommodate the voltage ripple that is caused by current sinking or sourcing of the auxiliary circuit. The larger value of the two is caused by the latter since the current source is designed to sink or source the nominal current.

The largest voltage swing provided by the auxiliary (bi-directional) current source occurs when the current mismatch is small ($i_{buck} \approx i_{load}$), and is described by Eq. 1, where $Q_g$ is the charge delivered from the auxiliary circuit during a single discharge cycle, $C_g$ is the GRSCC resonant tank capacitor and $V_{ref,M}$ is the steady-state value, depicted by Eq. 2.

$$V_{ref,H} - V_{ref,L} \geq Q_g C_{out} = 8 V_{out} C_g / C_{out} \qquad \text{Eq. 1}$$

$$V_{ref,M} = \frac{V_{ref,H} + V_{ref,L}}{2} \qquad \text{Eq. 2}$$

Figure 12A:
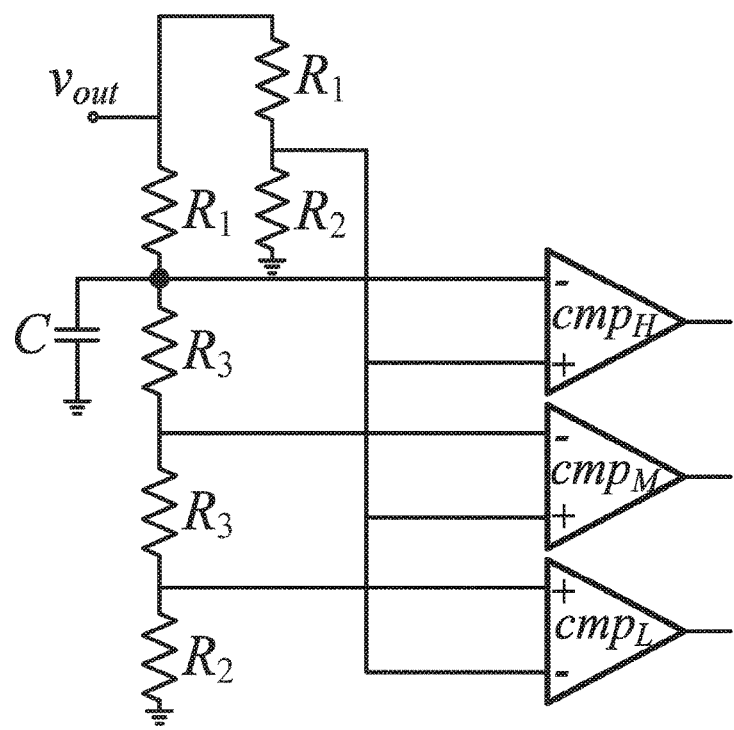

FIG. 12a illustrates a possible implementation of the detection circuit according to an embodiment of the invention. The detection circuit comprises a first voltage divider ladder for the reference voltage setting, and a second voltage divider ladder for the output voltage measurement. Using this configuration, the reference voltages can be designed according to Eq. 3a-3c.

$$V_{ref,H} = \frac{R_2 + 2R_3}{R_1 + R_2 + 2R_3} V_{out}, \qquad \text{Eq. 3a}$$

$$V_{ref,M} = \frac{R_2 + R_3}{R_1 + R_2 + 2R_3} V_{out}, \qquad \text{Eq. 3b}$$

$$V_{ref,L} = \frac{R_2}{R_1 + R_2 + 2R_3} V_{out}. \qquad \text{Eq. 3c}$$

The key criterion for the implementation of the transient detection circuit is by creating a measurement window with detection thresholds above and below the target output voltage. This can be done directly on the output voltage or on a sensed version of it. In this case, the measurement window will be proportional to the output voltage level.

Figure 12B:
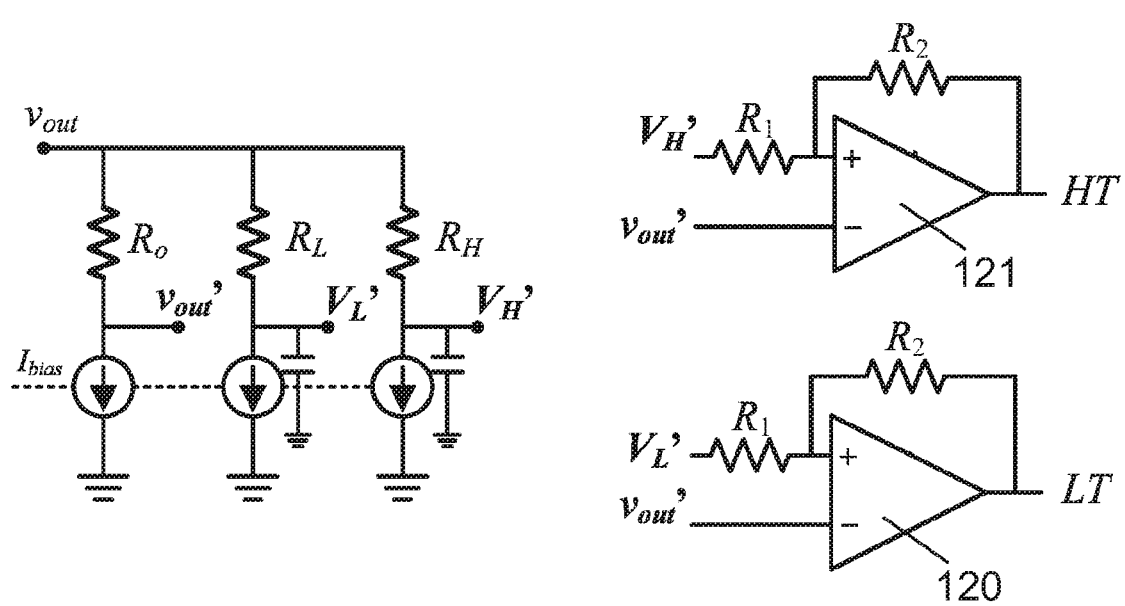

FIG. 12b illustrates an alternative possible implementation of the detection circuit, according to another embodiment of the invention. In this embodiment, the output voltage comparing where $v_{out}$ is sampled by a current source $i_{bias}$ that generates an indicative signal $v'_{out}$ which is lower than $v_{out}$ but sufficient to indicate changes in $v_{out}$. Two thresholds are generated by similar current sources $i_{bias}$. The first threshold is the low threshold $V'_L = i_{bias} * R_L$. The second threshold is the high threshold $V'_H = i_{bias} * R_H$.

The indicative signal $v'_{out}$ is sensed by two comparators. The low threshold $V'_L$ is input to the first comparator 120, for detecting when the output voltage $v_{out}$ falls below $V'_L$, in case of loading, and for providing a logic level indicating that $v'_{out} < V'_L$. The high threshold $V'_H$ is input to the second comparator 121, for detecting when the output voltage $v_{out}$ rises above $V'_H$, in case of unloading, and for providing a logic level indicating that $v'_{out} > V'_H$. The values of R1 and R2 are selected to determine a desired hysteresis, to prevent exceeding a threshold, as a result of noise (or other disturbing signals). In this case, the measurement window will be independent of the output voltage level.

Auxiliary Current Source Realization

There are several embodiments of the auxiliary current source that is used in the electronic capacitor circuit. The main concept is to realize a bi-directional current source that can react immediately and can source or sink current with the maximum allowed load step magnitude, $I_{max}$. In this section, three embodiments for the auxiliary current source are introduced.

In one embodiment an auxiliary current source is realized by switched-capacitor converters in the form of the GRSCC, which has been found the most suitable for the application. It does not require a magnetic element, can be operated at high frequencies with soft-switching and maintains high efficiency over a wide and continuous step-up/step-down conversion ratio. Furthermore, it has a bi-directional current sourcing behavior and is able to react immediately to create current step response with bandwidth of up to half its maximal switching frequency.

A voltage doubling variation of the GRSCC is shown as the auxiliary current source 101 in the electronic capacitor of FIG. 1. It is structured relying on a classical voltage multiplying resonant switched capacitor converter topology, shifting the GRSCC optimal efficiency point from $V_{out}$ to $V_{aux} = 2V_{out}$. The main reason for the selection of this topology is to increase the power density of the auxiliary storage capacitor $C_{aux}$ by increasing its rated voltage, but without adding voltage stress to the transistors. Another advantage of the doubling realization is that the desired current, i.e. $I_{max}$ can be obtained by a higher characteristic impedance of the resonant network. This implies that higher target efficiency of the GRSCC can be obtained for a given loop resistance.

Figure 13:
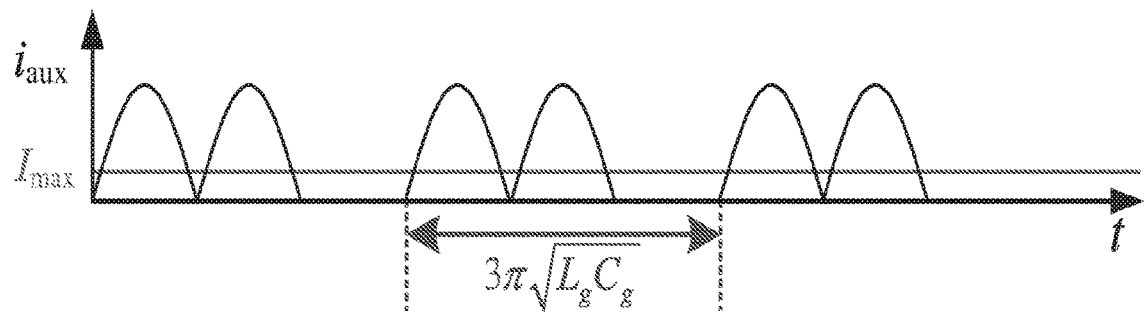
FIG. 13 schematically illustrates a GRSCC output current waveform.
Figure 14:
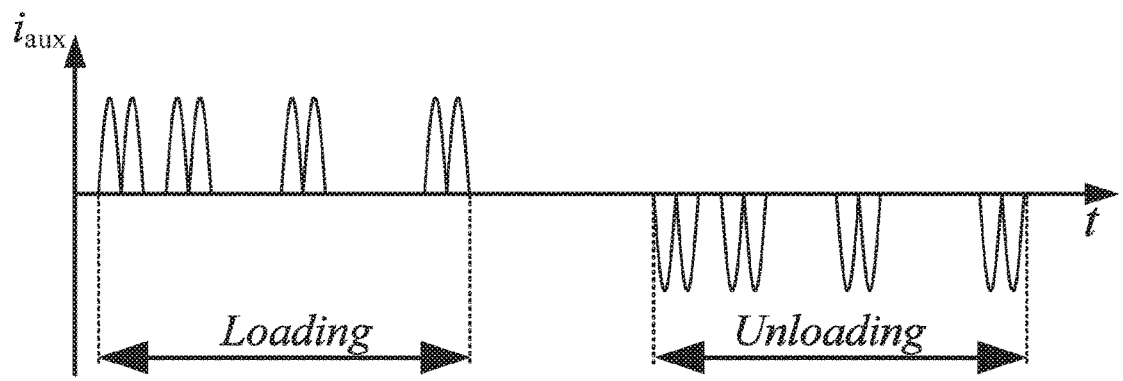
FIG. 14 schematically illustrates a GRSCC auxiliary current waveform for loading and unloading transients.

The GRSCC is resonant in nature and can be completely halted at zero-current after each cycle, as can be observed in FIG. 13 which illustrates a waveform of the GRSCC output current, and in FIG. 14 which illustrates the auxiliary current waveform using a GRSCC for loading and unloading transients. As a result, the nominal current can be resumed within one cycle. This zero-order current-stepping capability enables the GRSCC to be used as the auxiliary current source unit. Moreover, there is no limitation to scalability as the resonant tank values can be determined for any desired $V_{out}$ and operating frequency. The bridge configuration also guarantees that the maximum stress on any given switch will be around $V_{out}$, which enables small area requirements of the power transistors.

Figure 15:
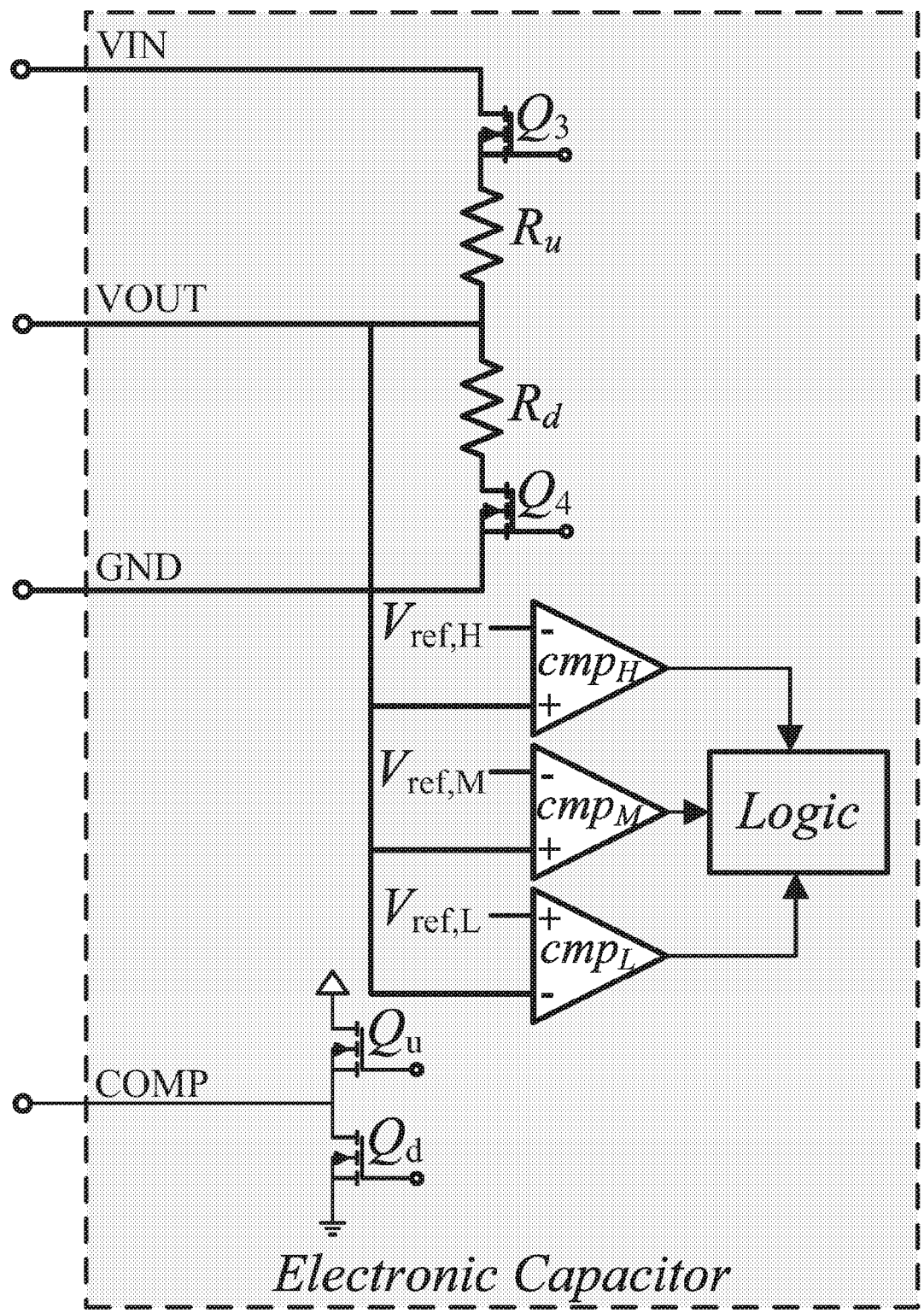
FIG. 15 schematically illustrates an implementation of an auxiliary current source.
Figure 16:
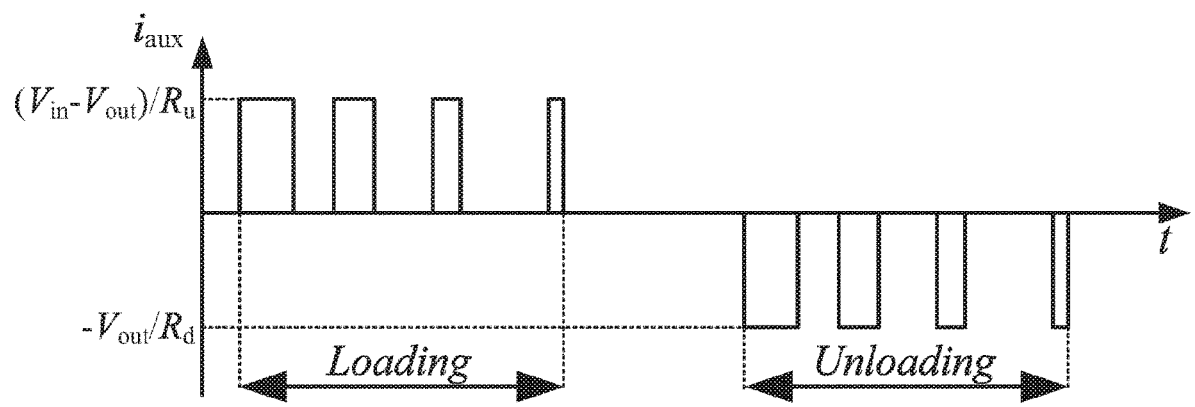
FIG. 16 schematically illustrates an auxiliary current waveform during loading and unloading transients while using the implementation of FIG. 15.

According to another embodiment of the invention, the auxiliary current source is implemented using two MOSFETs with relatively high $R_{DS(on)}$, as depicted in FIG. 15, wherein $R_u$ and $R_d$ are the MOSFETs' $R_{DS(on)}$ resistance of $Q_3$ and $Q_4$, respectively. According to this embodiment, another port for the input voltage $V_{in}$ is used, but it should be noted that this port can be connected to any voltage source that is higher than $V_{out}$. Using this extra port, one MOSFET, i.e. $Q_3$, is connected between $V_{in}$ and $V_{out}$ for current sourcing during loading transients and another MOSFET, i.e. $Q_4$, is connected between $V_{out}$ and GND for current sinking during unloading transients. The resultant current waveform using this configuration is pulses with amplitudes that are equal or greater than $I_{max}$, as depicted in FIG. 16. It should be noted that the MOSFETs can be loosely selected, i.e. exact $R_{DS(on)}$ is not mandatory, since the controller will compensate for any mismatch between the desired resistance and the existing one, as long as the condition of Eq. 4 holds.

$$\frac{V_{in} - V_{out}}{R_u}, \frac{V_{out}}{R_d} \geq I_{max} \qquad \text{Eq. 4}$$

Figure 17:
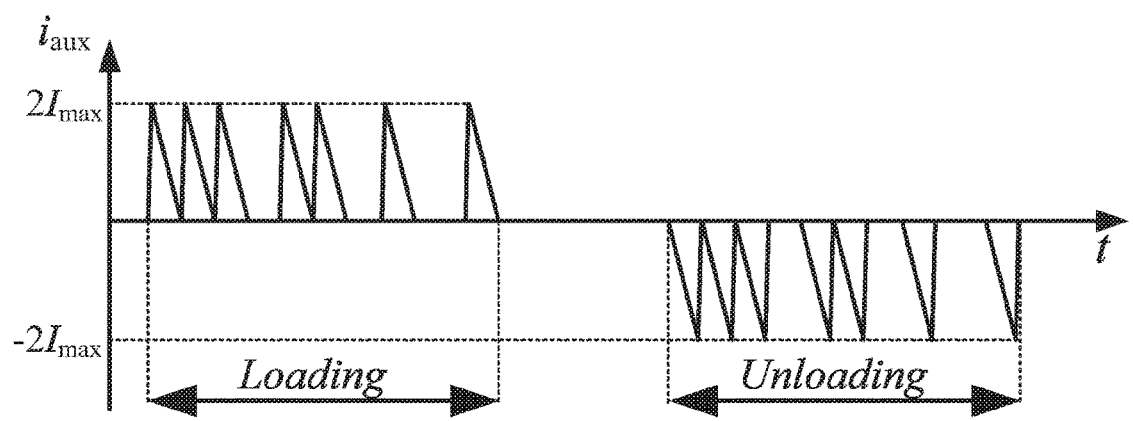
FIG. 17 schematically illustrates an auxiliary current waveform during loading and unloading transients while using another implementation of an auxiliary current source.

According to still another embodiment of the invention, the auxiliary current source is implemented using a synchronous buck converter operating in Discontinuous Conduction Mode (DCM). Furthermore, the converter can be used as a synchronous boost converter from the output to the input. Therefore, this topology can be used as the bi-directional auxiliary current source for the electronic capacitor circuit, as depicted in FIG. 17, wherein inductor $L_{aux}$ represents the DCM buck, along with $Q_3$ and $Q_4$. In a similar manner to the previous embodiment, this solution requires an additional port that is connected to $V_{in}$ or any voltage source that is higher than $V_{out}$.

Figure 18:
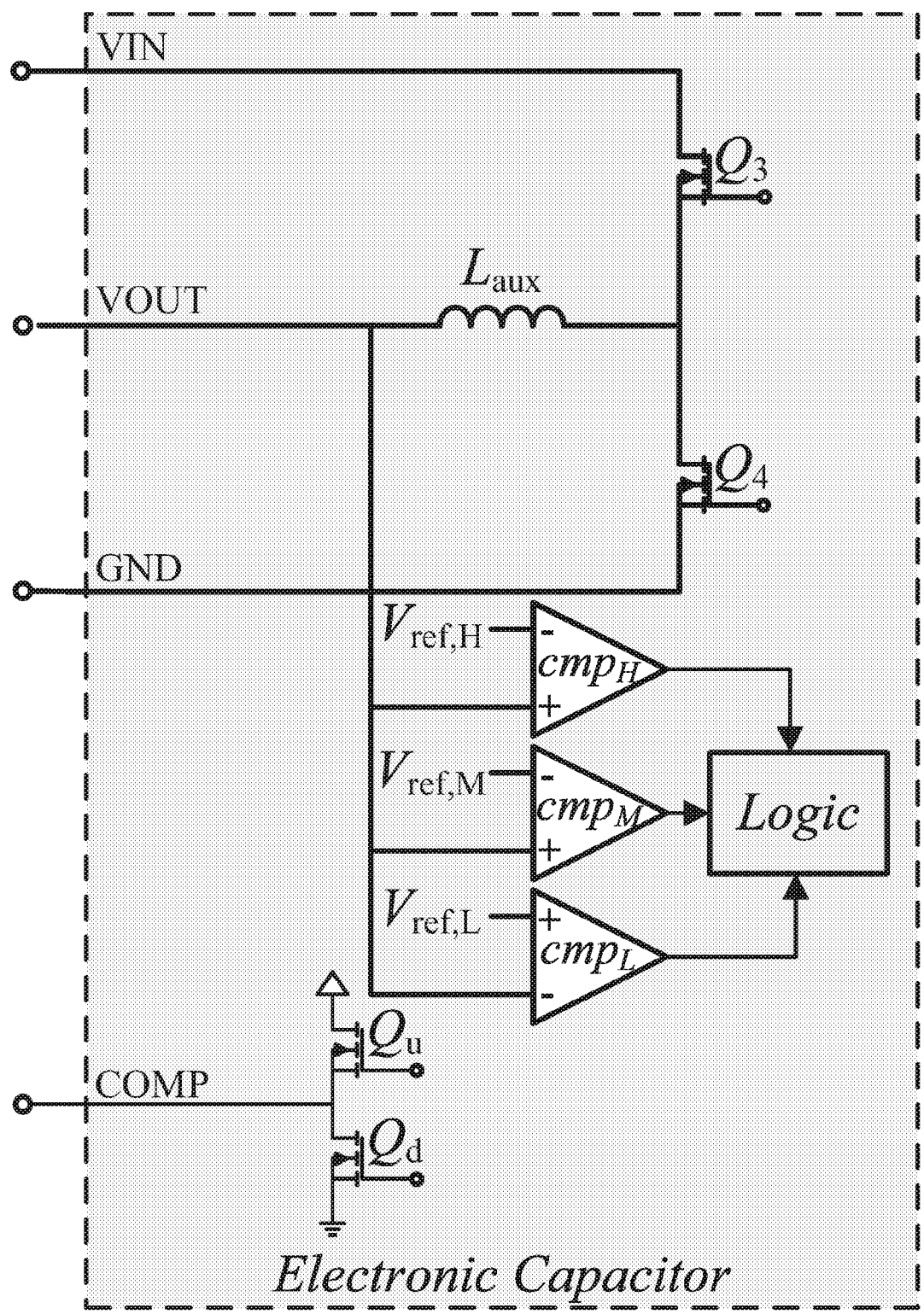
FIG. 18 schematically illustrates another auxiliary current source implementation.

For a loading transient, the circuit in FIG. 18 operates as a buck converter in DCM, sourcing current to the $V_{OUT}$ port. For an Unloading transient, the circuit operates as a boost converter, sinking current for the VOUT port. Here, the auxiliary current waveform is triangular as depicted in FIG. 17, with peak current that is equal or higher than $2I_{max}$.

Therefore, the on-time generator for the MOSFETs, $T_{on}$, is different for loading and for unloading transients, and is given by Eq. 5.

$$T_{on,loading} \geq \frac{2I_{max}L_{aux}}{V_{in} - V_{out}}, \quad T_{on,unloading} \geq \frac{2I_{max}L_{aux}}{V_{out}} \qquad \text{Eq. 5}$$

Simulation Results

Figure 19:
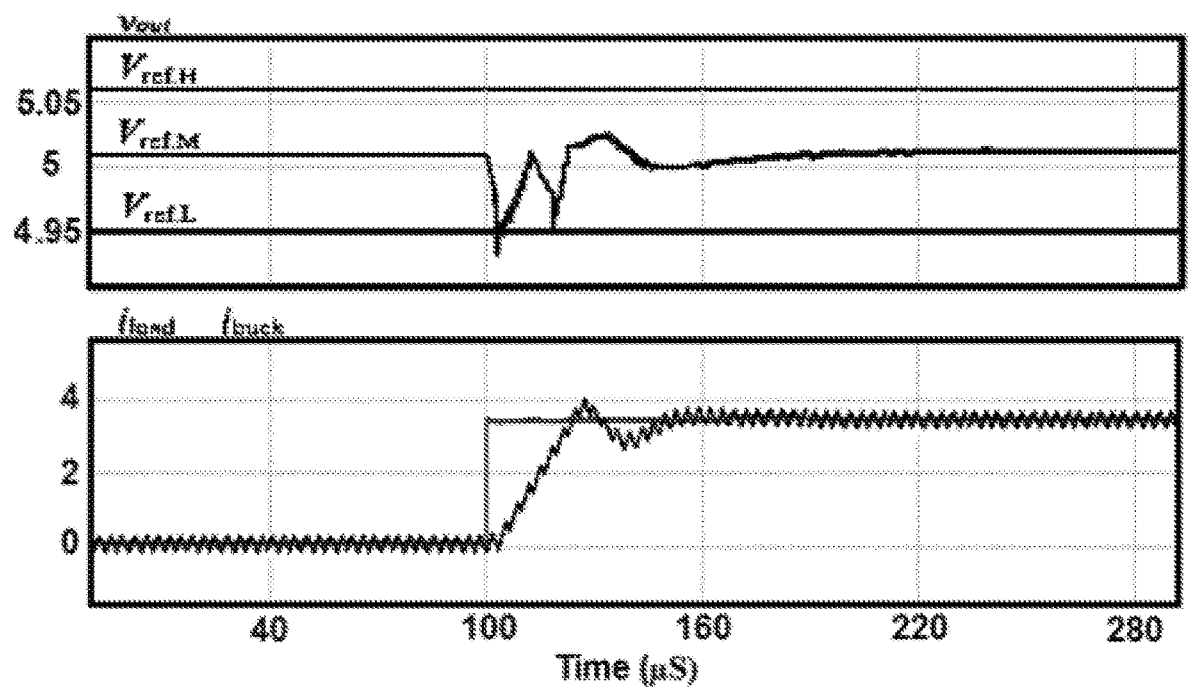
FIG. 19 shows simulation waveform results of a GRSCC as an auxiliary current source assisting a buck converter to handle a loading transient.
Figure 20:
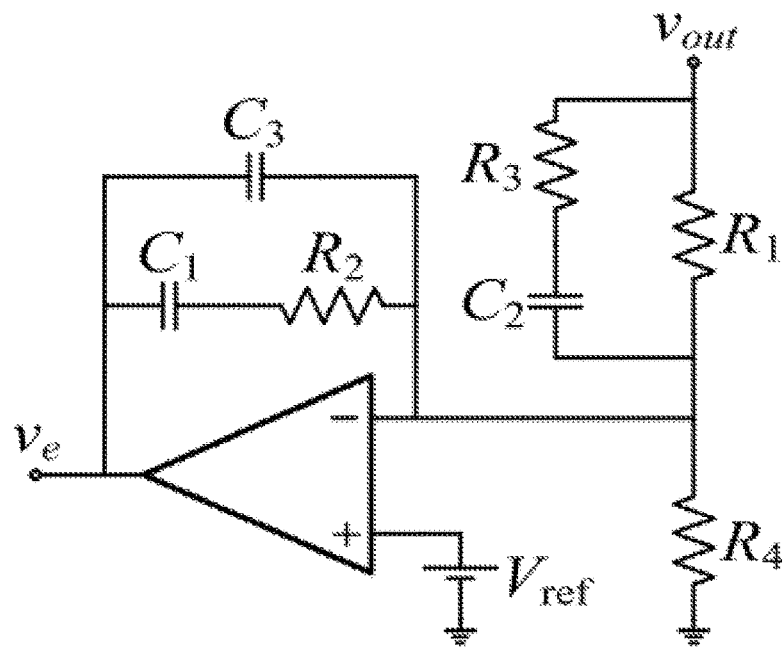
FIG. 20 schematically illustrates an analog controller with a type III compensation network.

A simulation of the GRSCC as an auxiliary current source assisting a buck converter to handle a loading transient is depicted in FIG. 19. The buck is a 12V to 5V converter, controlled by an analog controller with a type III compensation network as depicted in FIG. 20. The thresholds of the electronic capacitor's comparators are set to be ±50 mV off the output voltage steady-state value, and the GRSCC is designed to source a current of 5 A to the output terminals of the buck converter.

A loading transient from 0 A to 3.5 A causes the output voltage to drop and cross $V_{ref,L}$, triggering $cmp_L$ and a loading transient is detected by the electronic capacitor. The transient response accelerator is activated, the duty ratio is saturated to the maximal value, and the GRSCC sources 5 A. Since $i_{aux} + i_{buck} > i_{load}$, the output voltage rises and crosses $V_{ref,M}$, halting the GRSCC current sourcing. At this point, the load current is still higher than the inductor current ($i_{buck}$) and the output voltage drops again, crossing $V_{ref,L}$ once more, re-triggering the GRSCC. After the output voltage rises and when it crosses $V_{ref,M}$ for the second time, the GRSCC operation is halted again, the inductor current is higher than the load current and charge balance is achieved. At this point, the end of transient is detected, the transient response accelerator is deactivated and steady-state operation is resumed without any need for compensator reset or update.

Experimental Results

In order to validate the operation of the electronic capacitor concept and to demonstrate the plug-and-play feature of the invention, an off-shelf Evaluation Module (EVM) of a 30 W 12-to-5V analog-controlled synchronous buck converter from Texas Instruments Inc. (TPS40055) was selected to serve as the already compensated (type III scheme) and optimized voltage regulator. The electronic capacitor module was connected as an add-on circuit to the EVM reference design, as described in FIG. 1. The auxiliary circuit was realized by a GRSCC with sinking and sourcing current capability of 6 A, as described hereinabove. The transient suppression unit's state-machine is implemented on an Altera Cyclone IV FPGA. Table 1 lists the components values and parameters of the experimental prototype and the comparator's threshold voltages setting. The load step signal is also generated by the FPGA, independently, without synchronization to the controller.

TABLE 1

| Component | Value/Type |
| --- | --- |
| Buck converter-Evaluation module | TI-TPS40055 |
| Input voltage $V_{in}$ | 12 V |
| Output voltage $V_{out}$ | 5 V |
| Switching frequency $f_s$ | 300 kHz |
| Output capacitor $C_{out}$ | 330 µF |
| Inductor L | 22 µH |
| MOSFETs | Si4946BEY, 41 mΩ |
| Comparator upper threshold $V_{ref,H}$ | 2.515 V |
| Comparator middle threshold $V_{ref,M}$ | 2.499 V |
| Comparator lower threshold $V_{ref,L}$ | 2.487 V |

TABLE 1-continued

| Component | Value/Type |
| --- | --- |
| GRSCC switching frequency. $f_g$ | 1.66 MHz |
| GRSCC resonant tank capacitor $C_g$ | 200 nF |
| GRSCC resonant tank inductor $L_g$ | 20 nH (stray inductance) |
| Auxiliary capacitor $C_{aux}$ | 20 µF |

It is further emphasized that voltage regulator has been assigned as prescribed by the reference design, including the exact bill of materials. The three ports of the electronic capacitor were connected to the output voltage terminal ($V_{OUT}$), the output of the analog controller's E/A (COMP) and to GND.

Figure 21B:
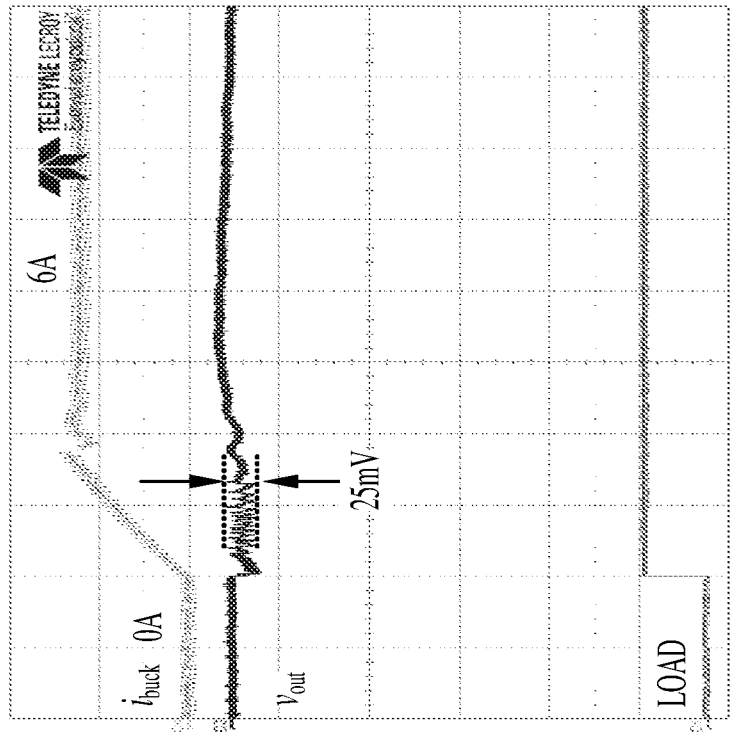
FIG. 21B shows a waveform of a buck converter's response with the assistance of an electronic capacitor during a loading transient of 6 A.
Figure 21A:
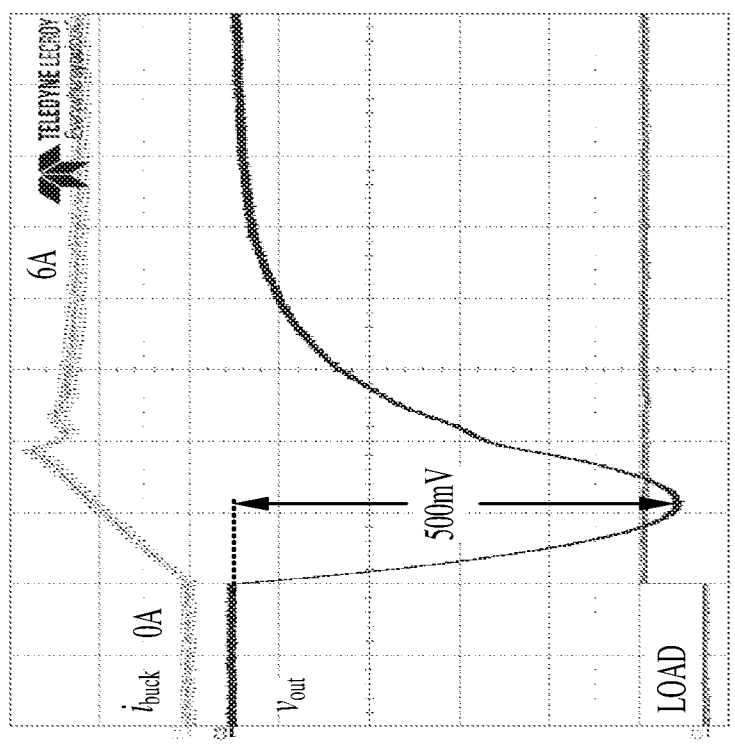
FIG. 21A shows a waveform of a buck converter's response without the assistance of an electronic capacitor during a loading transient of 6 A.
Figure 22A:
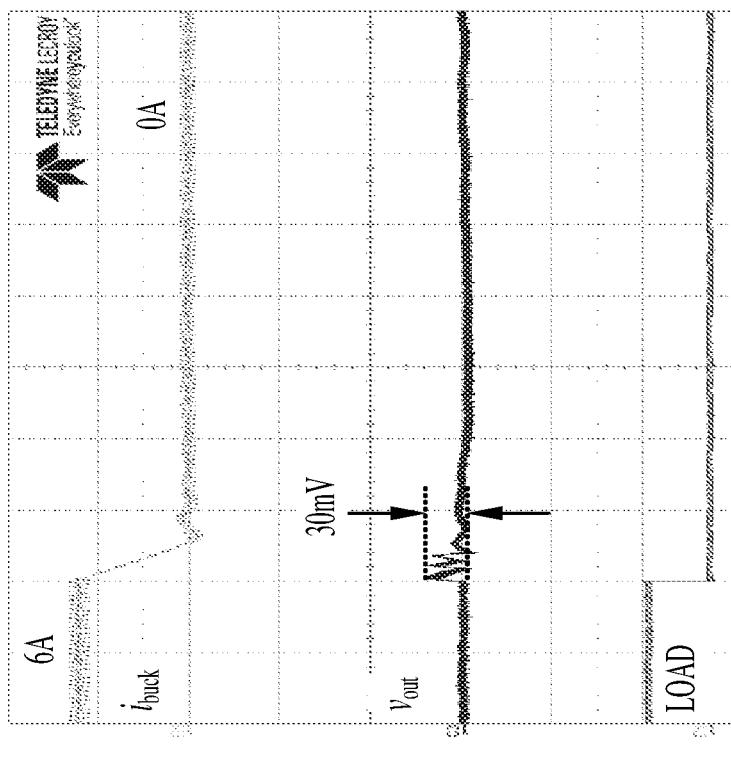
FIG. 22A shows a waveform of a buck converter's response without the assistance of an electronic capacitor during an unloading transient of 6 A.
Figure 22B:
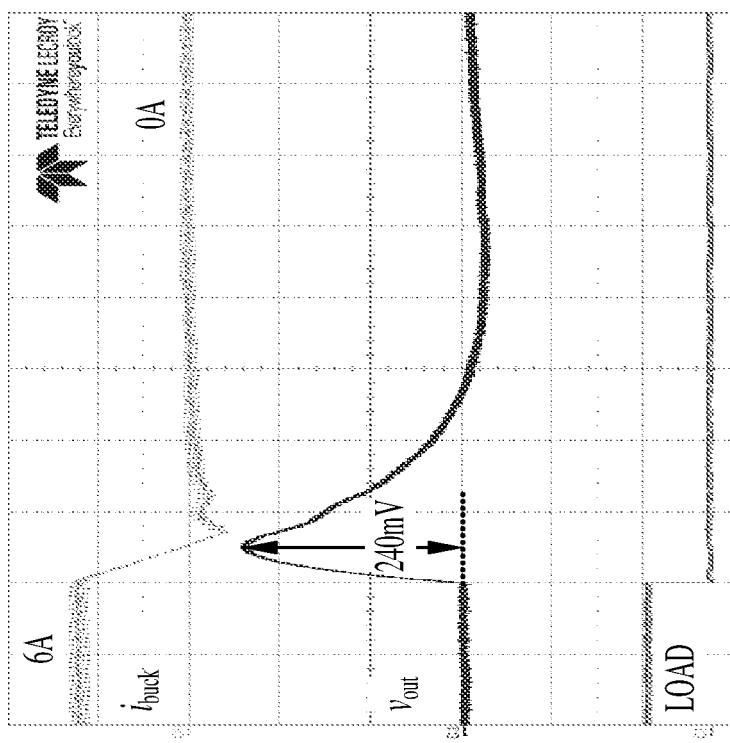
FIG. 22B shows a waveform of a buck converter's response with the assistance of an electronic capacitor during an unloading transient of 6 A.
Figure 23:
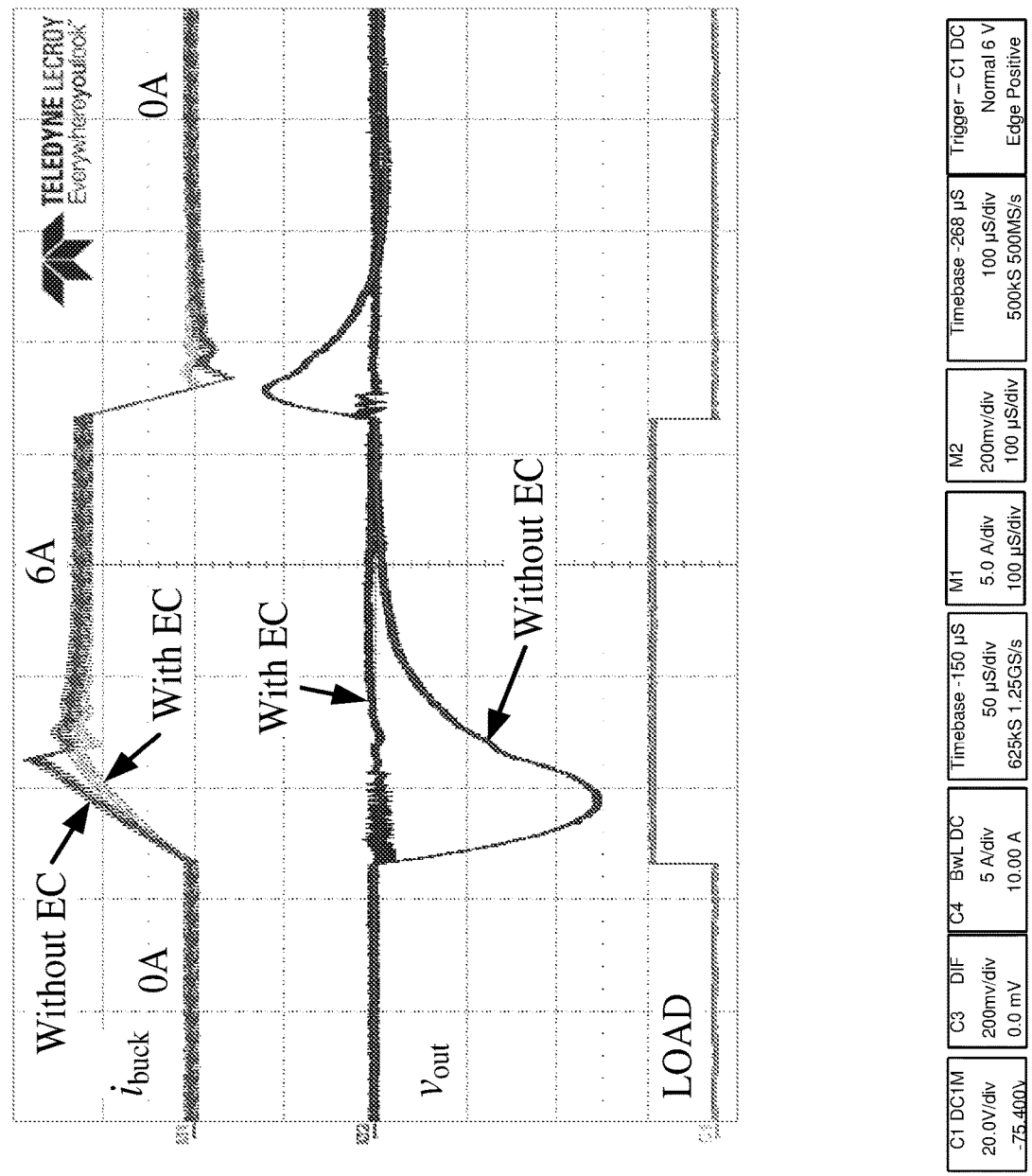
FIG. 23 shows a waveform of a consecutive 6 A loading-unloading transient response measured with and without an electronic capacitor.

A loading transient of 6 A, depicted in FIGS. 21A and 21B, is generated in order to compare the buck converter's response without the assistance of the electronic capacitor (FIG. 21A) and with the assistance of the electronic capacitor (FIG. 21B). As can be observed, without the electronic capacitor the output voltage undershoot is 500 mV and the response with the assistance of the electronic capacitor exhibits an output voltage undershoot of 25 mV. FIGS. 22A and 22B present a 6 A unloading transient response for the same cases. The output voltage overshoot without the electronic capacitor is now 240 mV, as shown in FIG. 22A, whereas the output voltage overshoot with the electronic capacitor sums to be 30 mV as shown in FIG. 22B. To get a full view of the system performance and automated TSU operation, a consecutive 6 A loading-unloading transient response was measured with and without the electronic capacitor, as depicted in FIG. 23. Using the electronic capacitor, the total transient time is only limited by the slew-rate of the inductor current, which are 80 µs for loading and 30 µs for unloading, whereas for the system without the electronic capacitor the total transient times are 500 µs and 275 µs, respectively.

Figure 24:
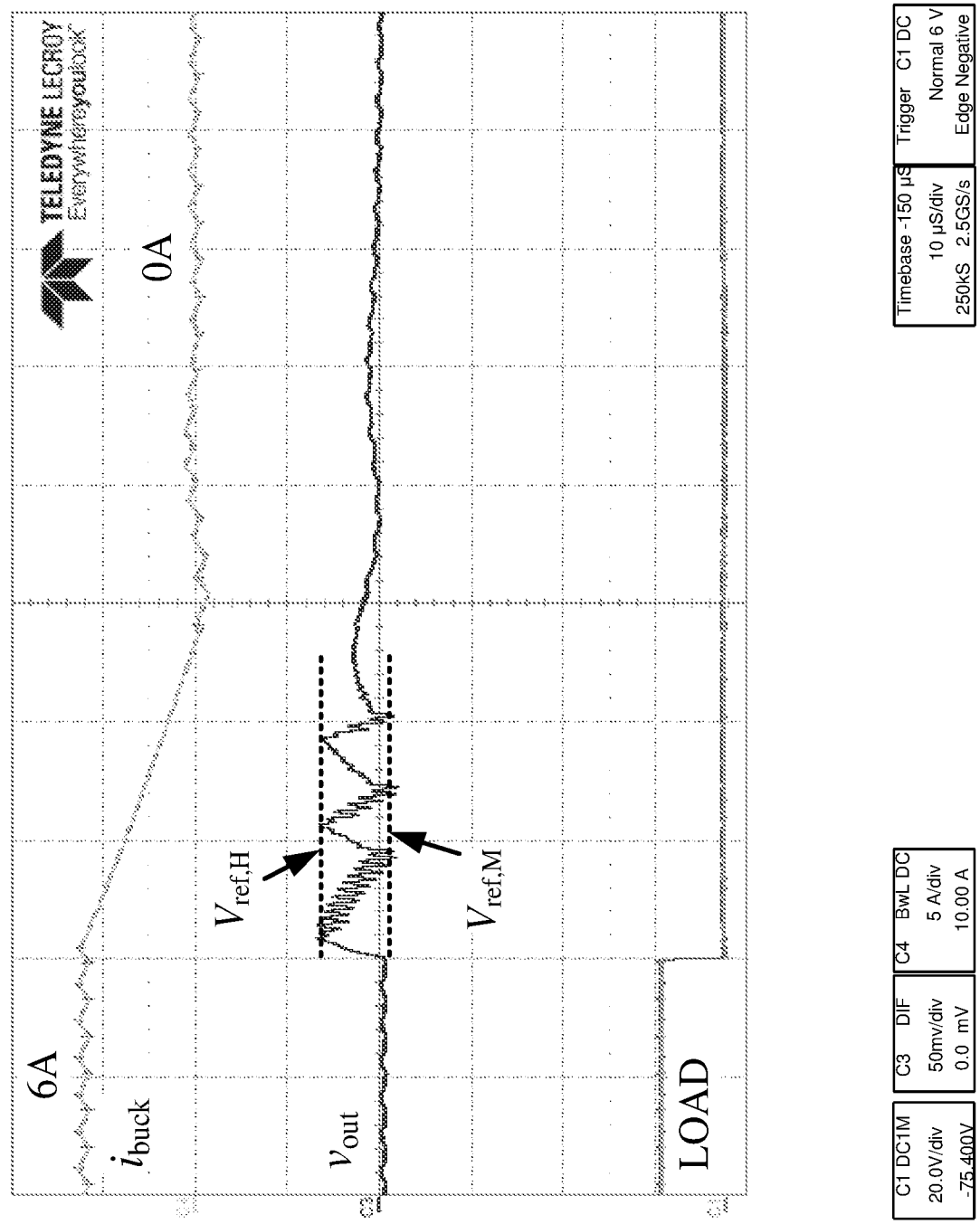
FIG. 24 shows a zoom-in to a waveform of an electronic capacitor operation for an unloading event.

FIG. 24 shows a zoom-in to the electronic capacitor operation which is based on the reference voltages $V_{ref,H}$ and $V_{ref,M}$ for an unloading event. As can be observed, the electronic capacitor maintains the output voltage between the two thresholds, sinks current when the output voltage crosses $V_{ref,H}$ and halts the operation when the output voltage reaches $V_{ref,M}$. This leads to the conclusion that the output voltage deviation for a system with the electronic capacitor is now determined by the comparator's thresholds, and that minimizing the difference between these thresholds is a function of the steady-state voltage ripple and the noise in the system. As a result, the output capacitance can be significantly reduced and sized to the steady-state specifications of the output voltage ripple, as opposed to sizing by the requirements of load transients.

Although embodiments of the invention have been described by way of illustration, it will be understood that the invention may be carried out with many variations, modifications, and adaptations, without exceeding the scope of the claims.

The invention claimed is:

1. A plug-and-play Transient Suppression Unit (TSU) for a Voltage Regulator Module (VRM) implemented as a buck converter, comprising:
 a. a bi-directional current source connected via a high voltage port and a low voltage port of the TSU in parallel to a voltage output of the VRM, adapted to immediately sink or source current to be supplied to a load;

b. a detection circuit for detecting mismatches between the voltage output of the VRM to a reference steady-state voltage, comprising:
  i. a first comparator for detecting a match between the voltage output of the VRM to the reference steady-state voltage;
  ii. a second comparator for detecting a mismatch between the voltage output of the VRM to a pre-defined threshold higher than the reference steady-state voltage; and
  iii. a third comparator for detecting a mismatch between the voltage output of the VRM to a pre-defined threshold lower than the reference steady-state voltage value;
wherein said TSU further comprises:
  c. a transient response accelerator, connected via a third port of said TSU to an output compensation port of a VRM error amplifier, adapted to control duty-ratio saturation of the VRM,
wherein a loading transient is detected by said third comparator, upon which the VRM's duty ratio is saturated to a maximal value by said transient response accelerator and current is sourced from the current source to the output, until the first comparator detects that the output voltage of said VRM matches the reference steady-state voltage and if the output voltage moves away from the steady-state value and crosses the third comparator threshold again, continuing current sourcing to the output voltage, until said first comparator detects that said steady state voltage has been consecutively reached twice, wherein an unloading transient is detected by said second comparator, upon which the VRM's duty ratio is saturated to a minimal value by the transient response accelerator and current is sunk from the output voltage into the current source, until the first comparator detects that the output voltage of the VRM matches the expected steady-state voltage, and if the output voltage moves away from the steady-state value and crosses the second comparator threshold again, continuing current sinking from the output voltage, until said first comparator detects that said steady state voltage has been consecutively reached twice.

2. A plug-and-play transient suppression unit (TSU) according to claim 1, wherein the bi-directional current source comprises a gyrator resonant switched-capacitor converter (GRSCC).

3. A plug-and-play Transient Suppression Unit (TSU) according to claim 1, wherein the transient response accelerator is connected via a third port of said TSU to an input of gate driving circuitry of power switches of the VRM.

4. A plug-and-play transient suppression unit (TSU) according to claim 1, further comprising a fourth port connected to a voltage source higher than the voltage output of the voltage regulator module (VRM), wherein the bi-directional current source comprises:
  a. a first MOSFET with a high $R_{DS(on)}$ value connected between the fourth port of the TSU and the high voltage port of the TSU, adapted to source current during loading transitions; and
  b. a second MOSFET with a high $R_{DS(on)}$ value connected between the high voltage port of the TSU and the low voltage port of the TSU, adapted to sink current during unloading transitions.

5. A plug-and-play transient suppression unit (TSU) according to claim 1, further comprising a fourth port connected to a voltage source higher than the voltage output of the voltage regulator module (VRM), wherein the bi-directional current source comprises a buck converter operating in a discontinuous conduction mode.

6. A plug-and-play transient suppression unit (TSU) according to claim 1, wherein the transient response accelerator comprises a first pull-up transistor and a second pull-down transistor, the transistors being complementary, the transistors connected to the compensation port of the error amplifier of the voltage regulator module (VRM), the transistors adapted to saturate the VRM's duty ratio.

7. A plug-and-play transient suppression unit (TSU) according to claim 1, in which loading or unloading transients are detected upon exceeding a window being between low and high reference steady-state voltages below and above the output voltage, the middle of said window is constant in case when the output voltage does not vary, or proportional to changes in said output voltage, if said output voltage varies.

8. A plug-and-play transient suppression unit (TSU) according to claim 1, wherein the detection circuit comprises:
  a. a first voltage divider ladder for setting the reference steady-state voltage, the threshold higher than the reference steady-state voltage and the threshold lower than the reference steady-state voltage; and
  b. a second voltage divider ladder for measuring the voltage output of the VRM.

9. A plug-and-play Transient Suppression Unit (TSU) according to claim 1, wherein the detection circuit comprises:
  a) a first current source and circuitry, for sensing the output voltage;
  b) a second current source and circuitry, for generating a low threshold voltage, independent of said output voltage;
  c) a third current source and circuitry, for generating a high threshold voltage, independent of said output voltage;
  d) the third comparator, receiving said low threshold voltage and said output voltage, for providing an indication whenever said output voltage falls below said low threshold voltage; and
  e) the second comparator, receiving said high threshold voltage and said output voltage, for providing an indication whenever said output voltage rises above said high threshold voltage.

10. A plug-and-play Transient Suppression Unit (TSU) according to claim 1, wherein the transient response accelerator comprises:
  a) a first pull-up transistor and a second pull-down transistor, the transistors being complementary, the transistors being connected to the compensation port of the error amplifier of a current-mode controller of the Voltage Regulator Module (VRM), the transistors adapted to saturate the VRM's duty ratio;
  b) the compensation port of the error amplifier being connected to said transistors via a resistive element;
  c) a peak detector for tracking changes in the inductor current;
  d) a reference capacitor Clref, connected between said compensation port and ground, for storing the inductor current represented by voltage on said reference capacitor Clref, such as at the end of the transient period, said capacitor Clref stores a voltage corresponding to a new steady-state point of said inductor current.

11. A plug-and-play Transient Suppression Unit (TSU) according to claim 10, further comprising a switch for disconnecting the reference capacitor $C_{lref}$ from the current mode controller when the TSU is active, and for reconnecting said reference capacitor $C_{I_{ref}}$ to the current mode controller, when the TSU is active and after the transient is terminated.

* * * * *